US012736076B2

(12) United States Patent
Arai

(10) Patent No.: US 12,736,076 B2
(45) Date of Patent: Sep. 15, 2026

(54) ANCHOR BOLT

(71) Applicant: A&S SYSTEM CO., LTD., Nara (JP)

(72) Inventor: Isamu Arai, Nara (JP)

(73) Assignee: A&S SYSTEM CO., LTD., Nara (JP)

( * ) Notice: Subject to any disclaimer, the term of this patent is extended or adjusted under 35 U.S.C. 154(b) by 409 days.

(21) Appl. No.: 18/287,875

(22) PCT Filed: Mar. 31, 2022

(86) PCT No.: PCT/JP2022/016622
§ 371 (c)(1),
(2) Date: Oct. 21, 2023

(87) PCT Pub. No.: WO2022/230604
PCT Pub. Date: Nov. 3, 2022

(65) Prior Publication Data

US 2024/0369090 A1 Nov. 7, 2024

(30) Foreign Application Priority Data

Apr. 30, 2021 (JP) ................................ 2021-077890

(51) Int. Cl.
*F16B 13/06* (2006.01)

(52) U.S. Cl.
CPC ................................. *F16B 13/065* (2013.01)

(58) Field of Classification Search
CPC ..... F16B 13/065; F16B 13/066; F16B 13/068
USPC .................... 411/57.1, 60.1, 60.2, 61, 62–65
See application file for complete search history.

(56) References Cited

U.S. PATENT DOCUMENTS 4,334,813 A * 6/1982 Oettl .................... F16B 13/065 411/75
4,447,182 A * 5/1984 Murbach .............. F16B 13/066 411/45
4,640,654 A * 2/1987 Fischer ................ F16B 13/066 411/60.2

(Continued)

FOREIGN PATENT DOCUMENTS

| | | | |
|---|---|---|---|
| CN | 1318124 | A | 10/2001 |
| CN | 103982504 | A | 8/2014 |
| DE | 34 12748 | A1 | 10/1985 |
| EP | 1 116 831 | A1 | 7/2001 |

(Continued)

OTHER PUBLICATIONS

Supplementary Partial European Search Report issued for the counterpart EP application No. 22795520 on Oct. 1, 2024.

(Continued)

*Primary Examiner* — Flemming Saether
(74) *Attorney, Agent, or Firm* — IP Business Solutions, LLC.

(57) ABSTRACT

An anchor bolt (11) including: a taper bolt (21) that is, with a screw thread formed on an outer peripheral surface, inserted in an anchor hole (91); a sleeve (25) that is attached to the taper bolt (21) and includes locking pieces (252) that are, in a state of being disposed in the anchor hole (91), locked to an inner side surface of the anchor hole (91); an annular expansively openable ring (26) attached to the taper bolt (21) at a position closer to a tip side of the taper bolt (21) than the sleeve (25), and divided in a peripheral direction; and a cone portion (27) configured to expand the expansively openable ring (26) radially outward by being pushed into an inner hole of the expansively openable ring (26).

8 Claims, 33 Drawing Sheets

(56) References Cited

U.S. PATENT DOCUMENTS

| | | | | |
|---|---|---|---|---|
| 4,854,793 | A | 8/1989 | Ollivier | |
| 4,917,552 | A * | 4/1990 | Crawford | F16B 13/126<br>411/32 |
| 4,971,494 | A * | 11/1990 | Gauthier | F16B 13/0858<br>411/61 |
| 9,562,558 | B2 * | 2/2017 | Anasis | F16B 43/002 |
| 11,859,647 | B2 * | 1/2024 | Chu | F16B 13/068 |
| 2002/0106256 | A1 * | 8/2002 | Kaibach | F16B 13/0858<br>411/60.1 |
| 2007/0098518 | A1 * | 5/2007 | Rosenkranz | F16B 13/066<br>411/60.2 |
| 2009/0142156 | A1 | 6/2009 | Pisoni | |
| 2016/0238052 | A1 | 8/2016 | Schaeffer | |
| 2021/0324893 | A1 | 10/2021 | Dohi et al. | |

FOREIGN PATENT DOCUMENTS

| | | | |
|---|---|---|---|
| JP | S62135704 | U | 8/1987 |
| JP | H04249608 | A | 9/1992 |
| JP | H07174119 | A | 7/1995 |
| JP | 2003268884 | A | 9/2003 |
| JP | 2009215730 | A | 9/2009 |
| JP | 2016536545 | A | 11/2016 |
| JP | 2017096470 | A | 6/2017 |
| WO | 2002008615 | A1 | 1/2002 |
| WO | 2020045348 | A1 | 3/2020 |

OTHER PUBLICATIONS

International Search Report issued for the prior international application No. PCT/JP2022/016622, on May 24, 2022.

* cited by examiner

【FIG. 1】
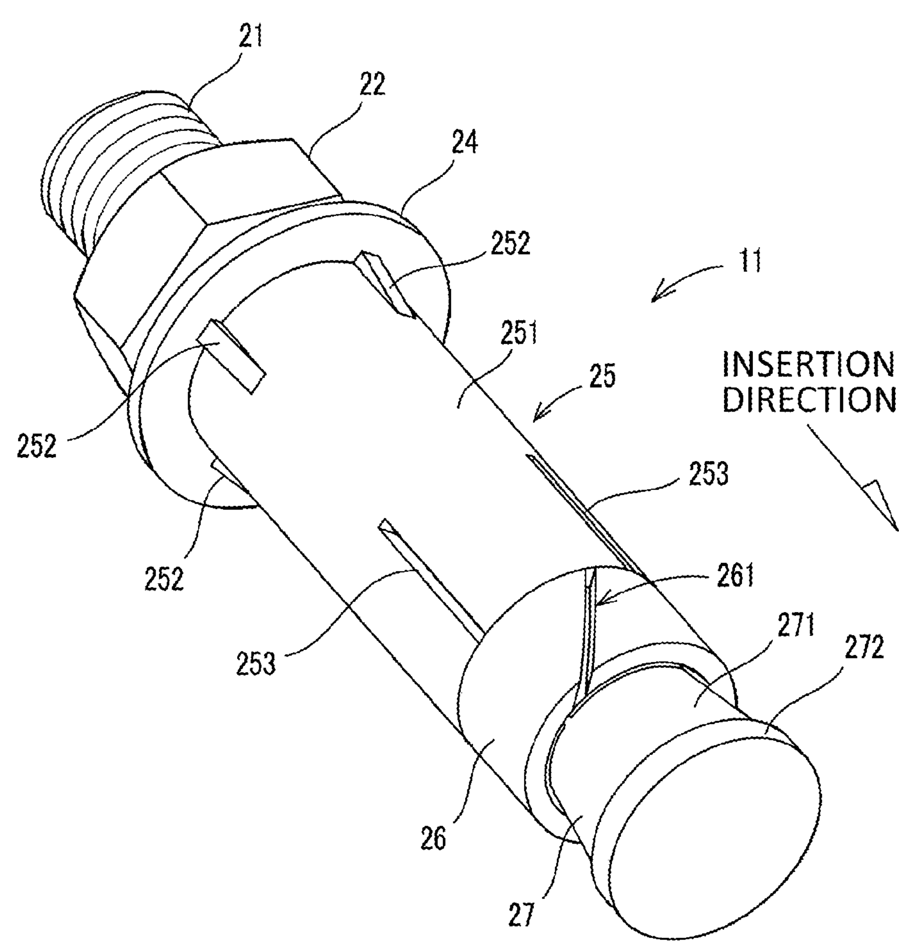

【FIG. 2】
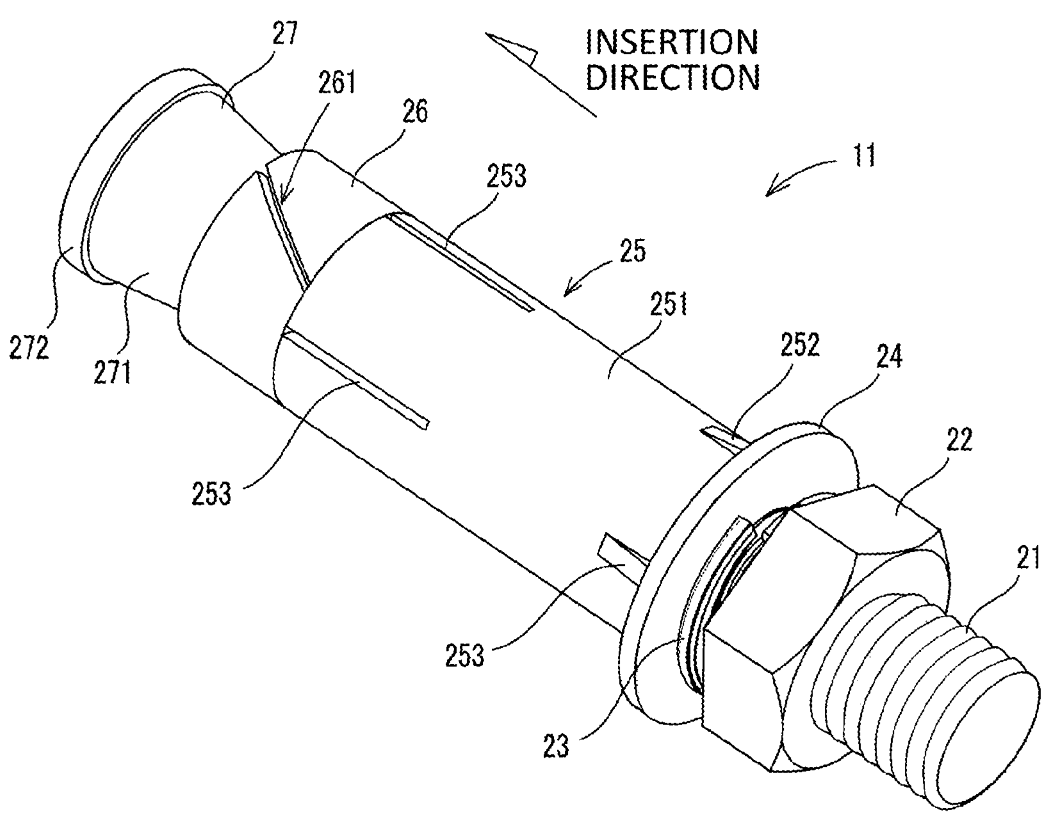

【FIG. 3A】
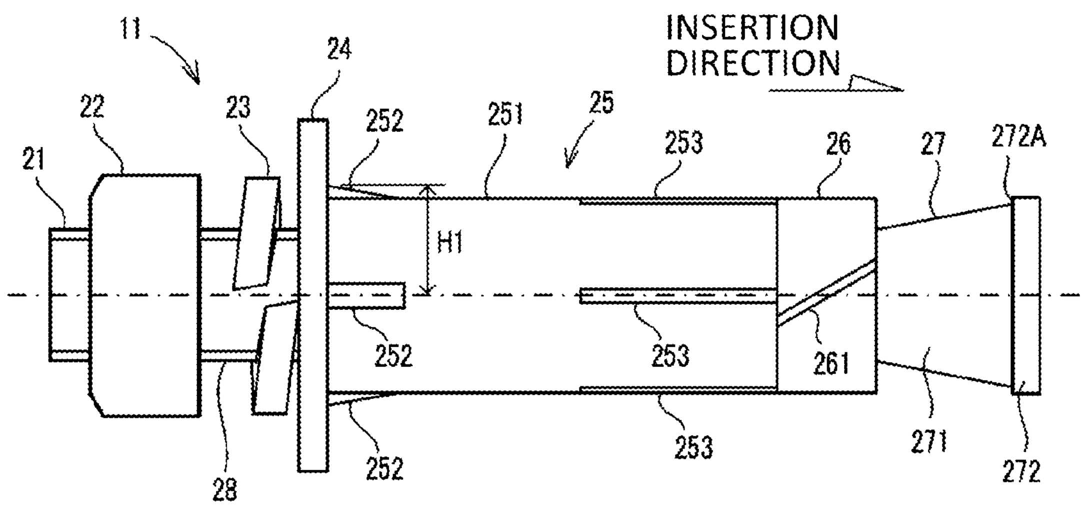

【FIG. 3B】
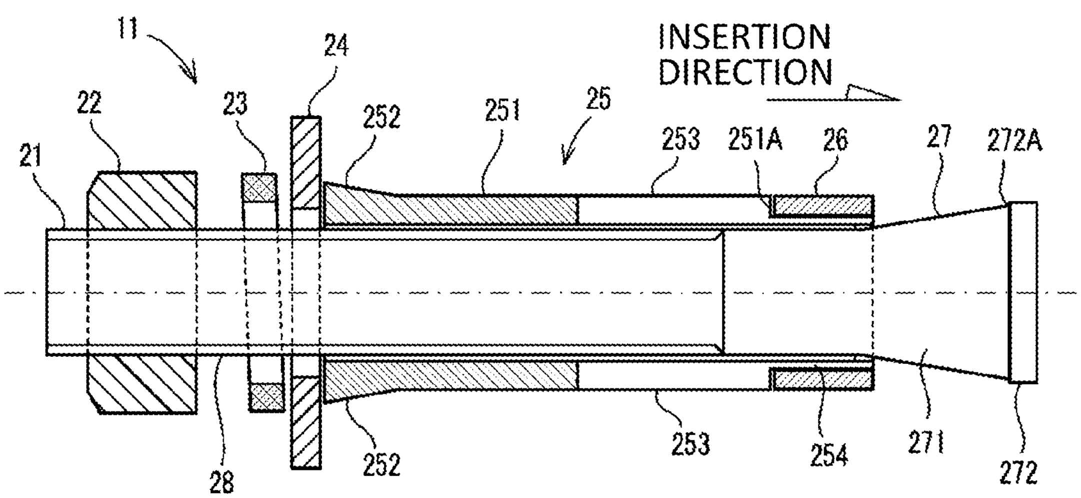

【FIG. 4A】
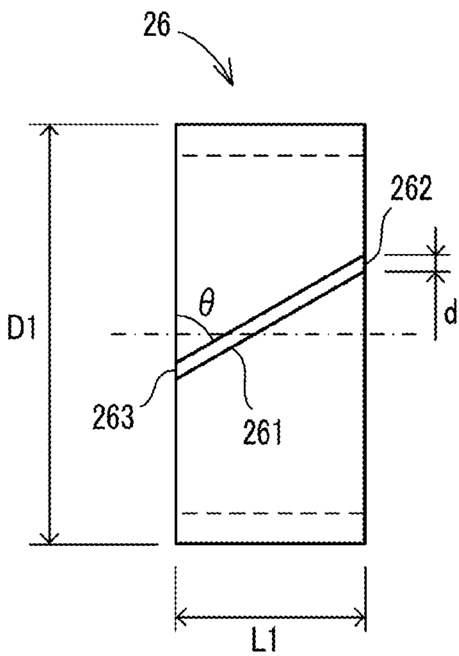

【ＦＩＧ．４Ｂ】
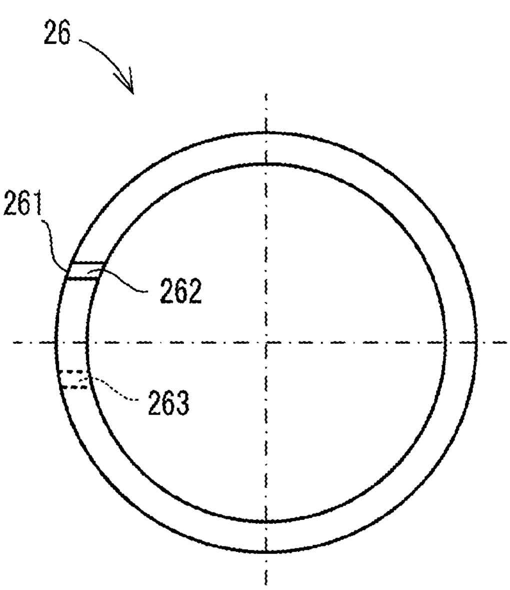

【FIG. 5A】
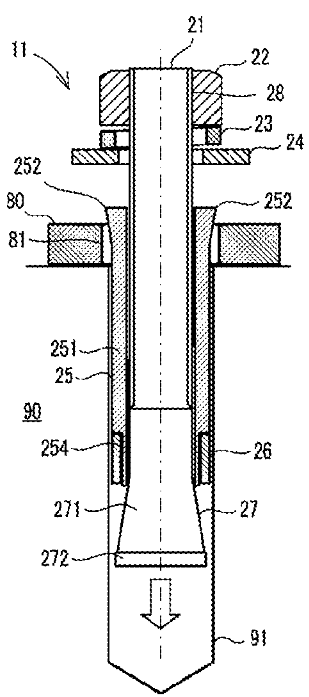

【FIG. 5B】
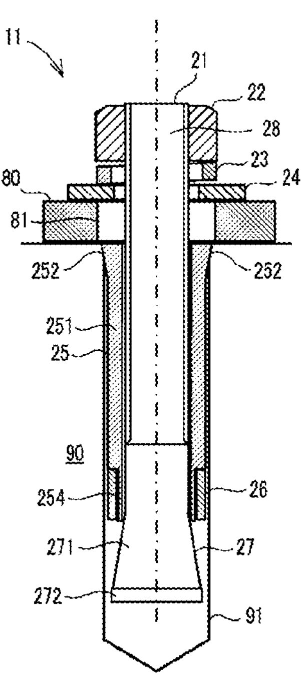

【FIG. 5C】
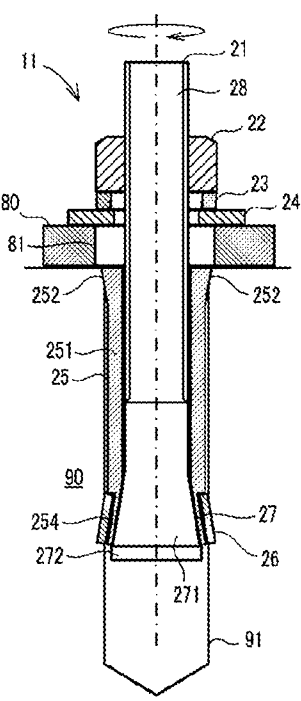

【ＦＩＧ．６Ａ】
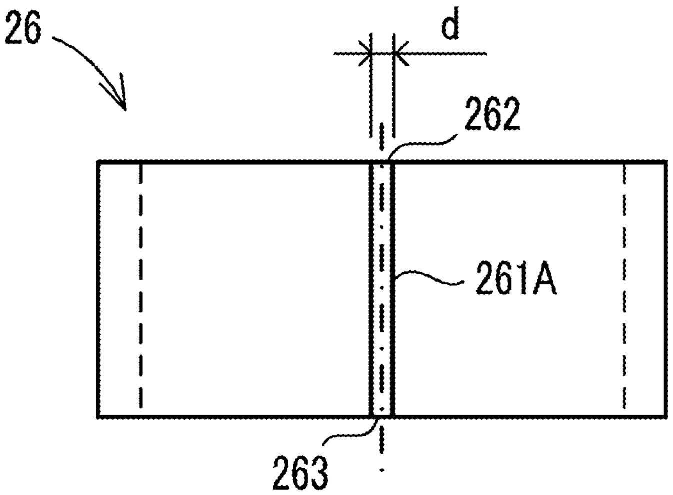

【ＦＩＧ．６Ｂ】
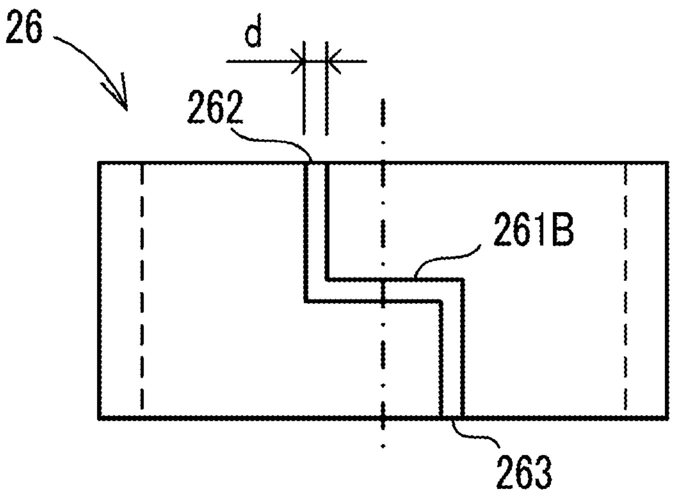

【FIG. 6C】
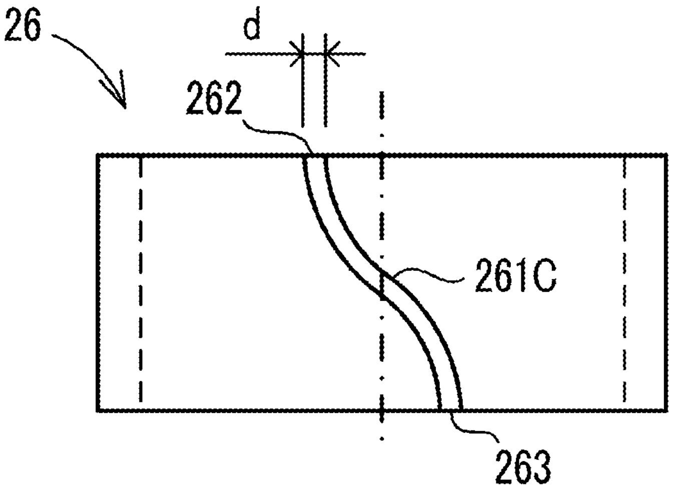

【FIG. 7】
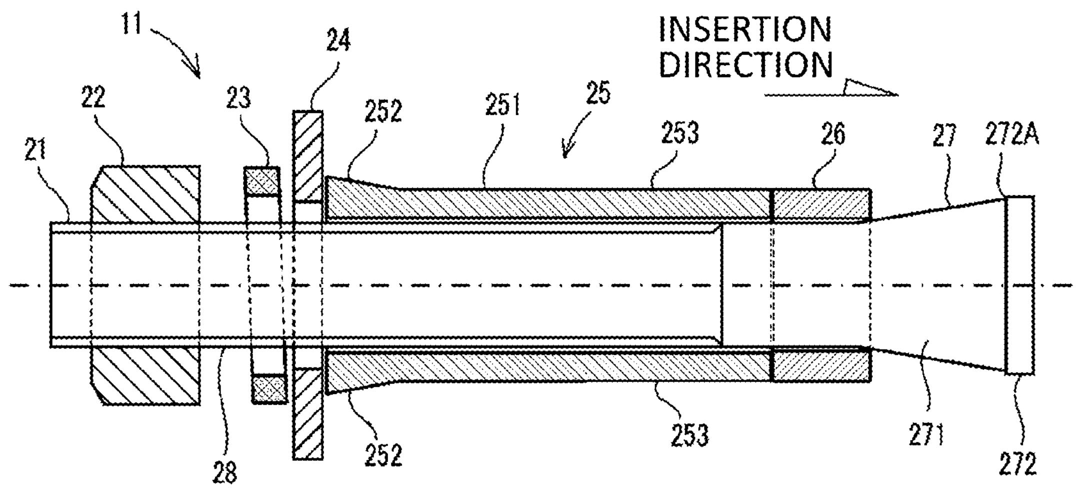

【FIG. 8】
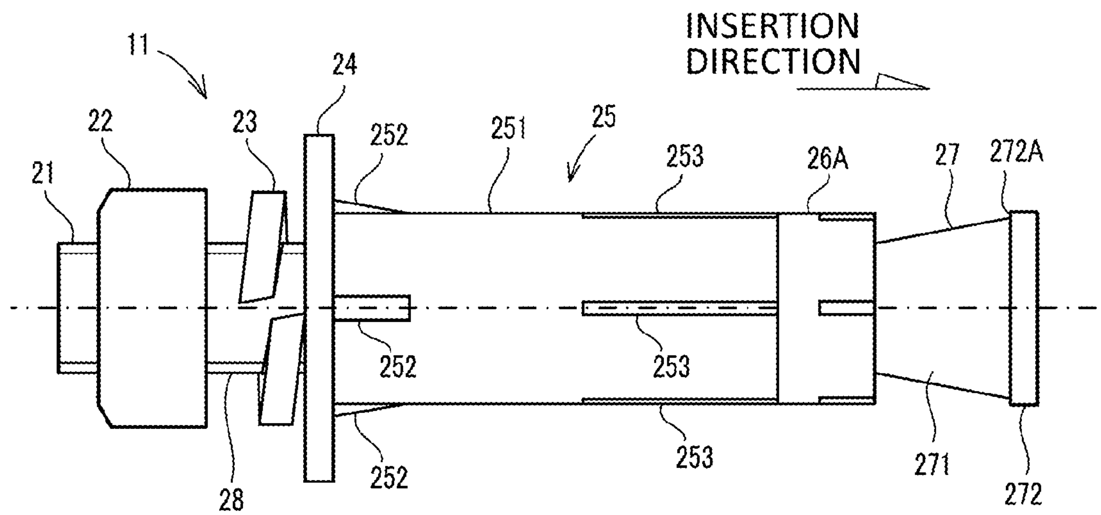

【FIG. 9】
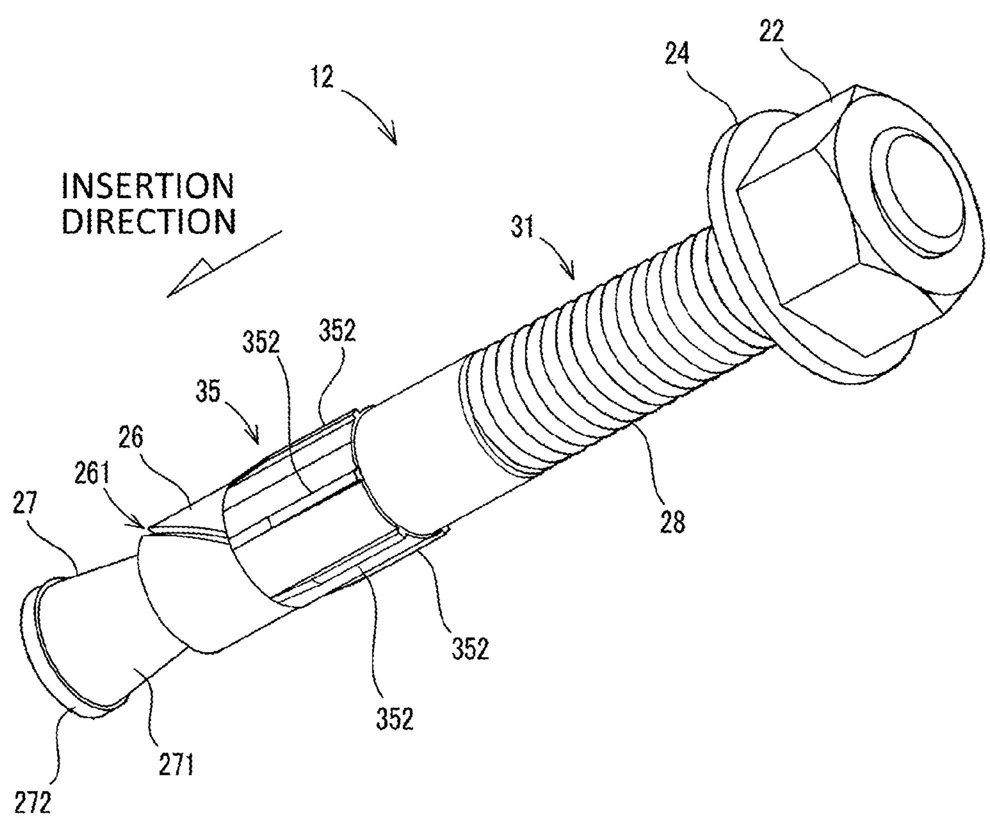

【FIG. 10A】
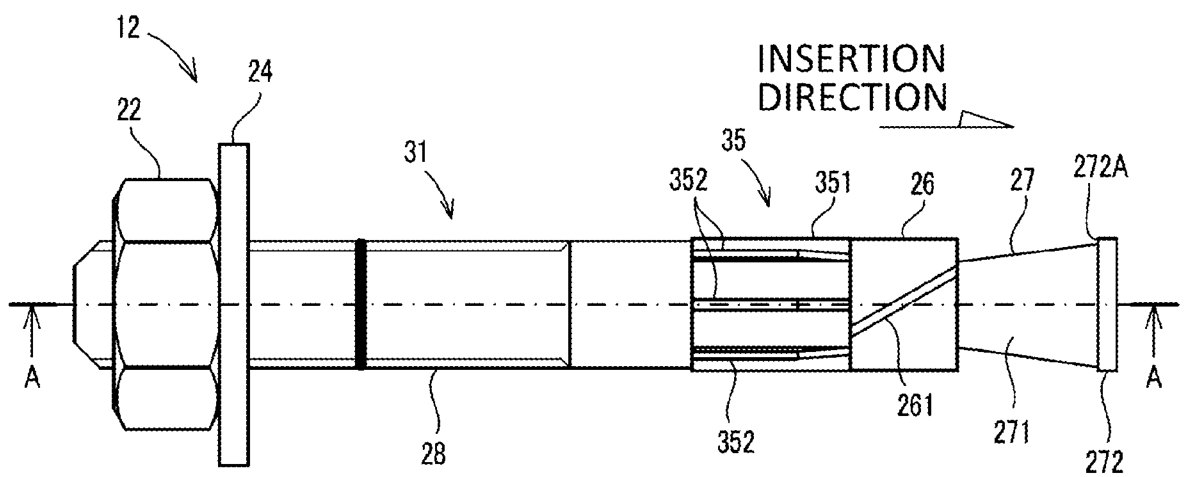

【FIG. 10B】
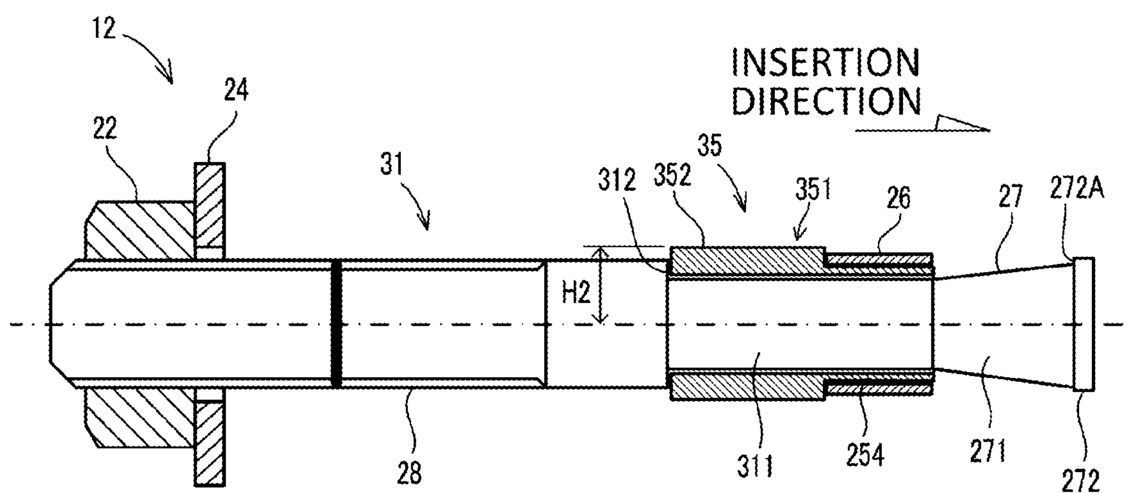

【FIG. 11A】
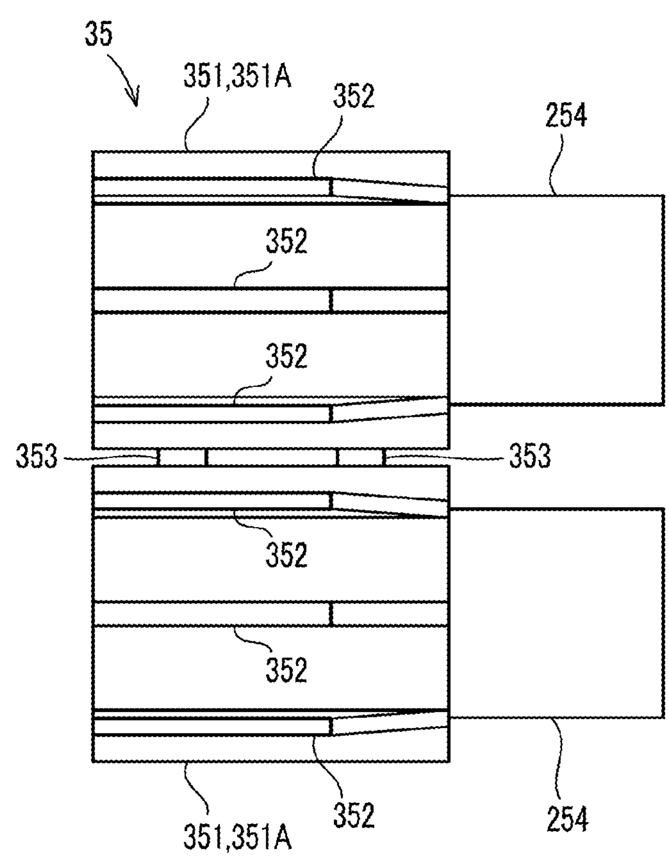

【ＦＩＧ．１１Ｂ】
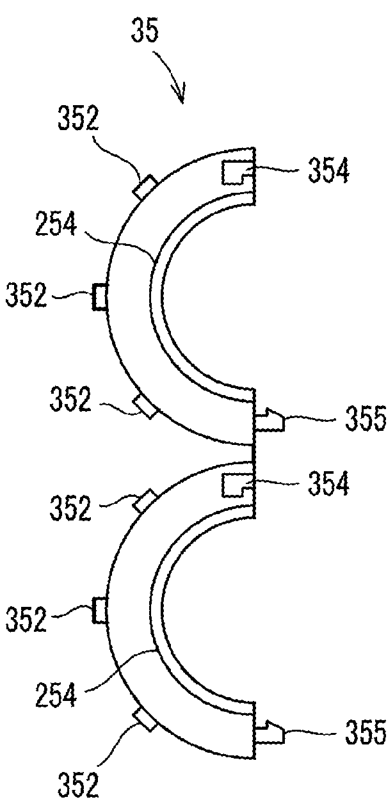

【ＦＩＧ．１２Ａ】
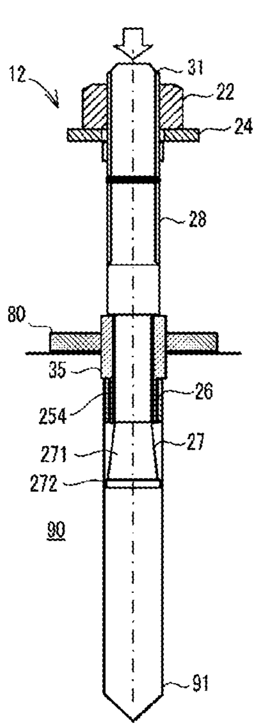

【ＦＩＧ．１２Ｂ】
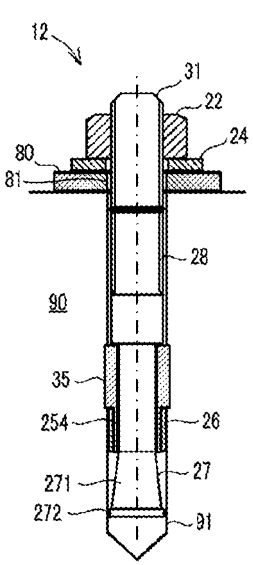

【ＦＩＧ．１２Ｃ】
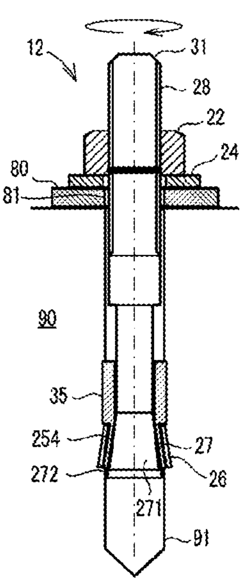

【FIG. 13】
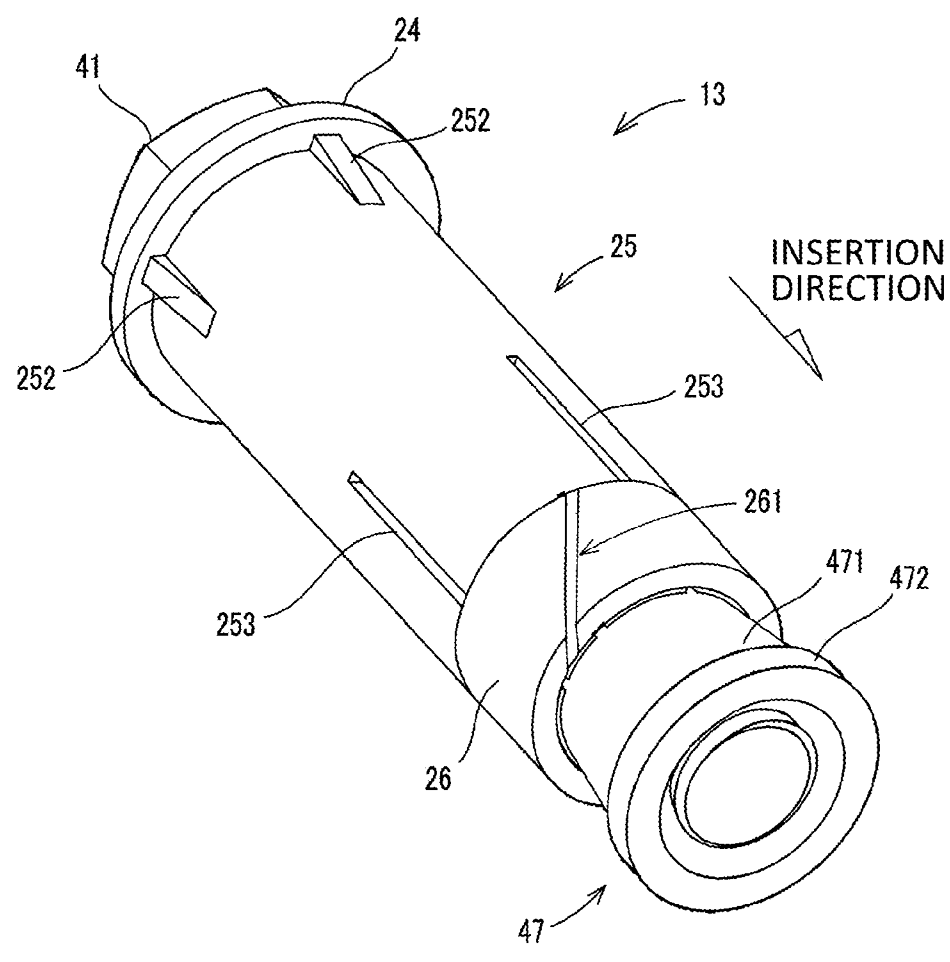

【ＦＩＧ．１４Ａ】
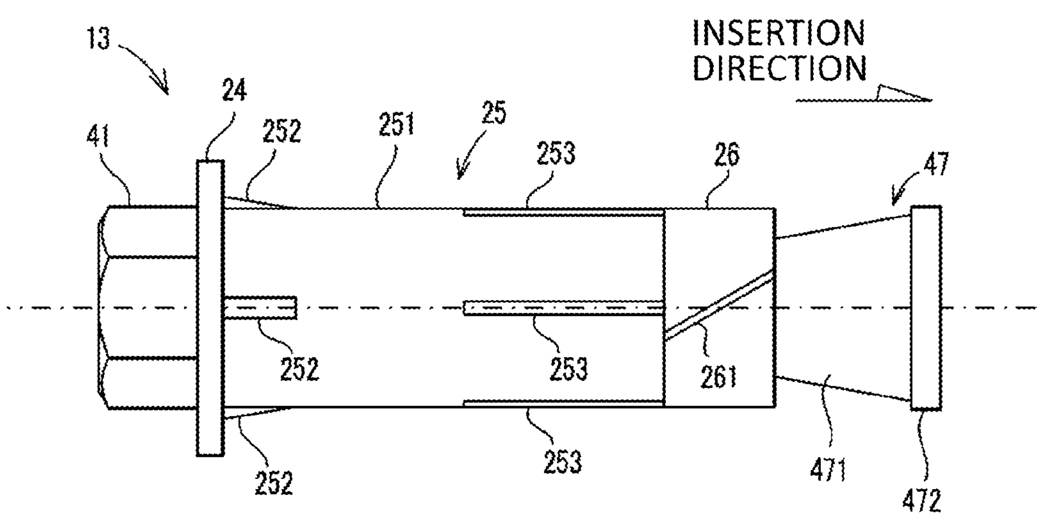

【FIG. 14B】
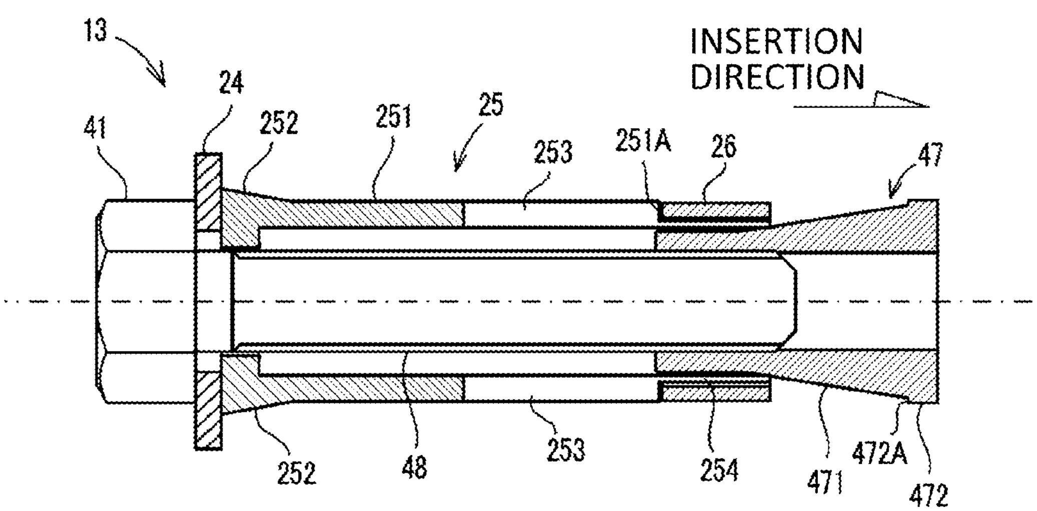

【FIG. 15A】
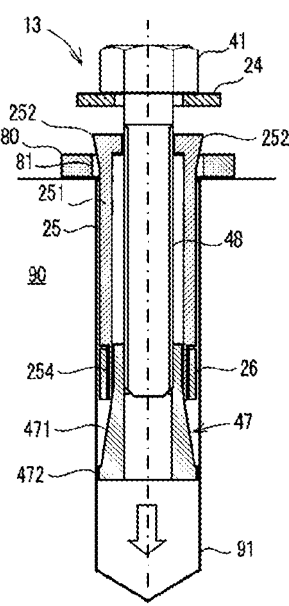

【ＦＩＧ．１５Ｂ】
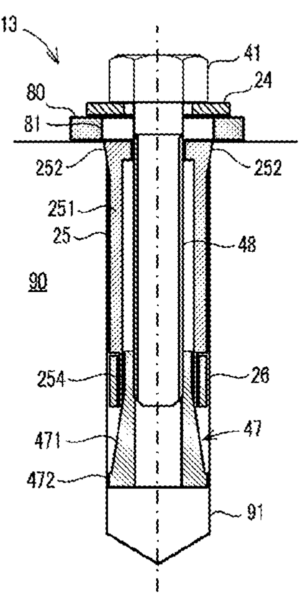

【FIG. 15C】
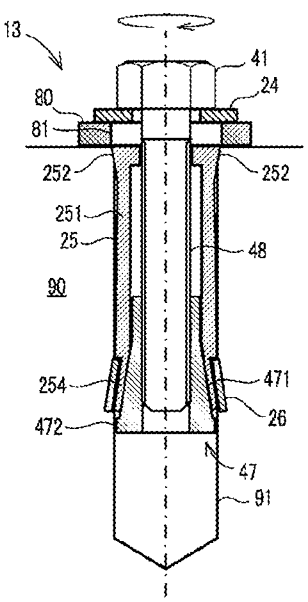

【FIG. 16】
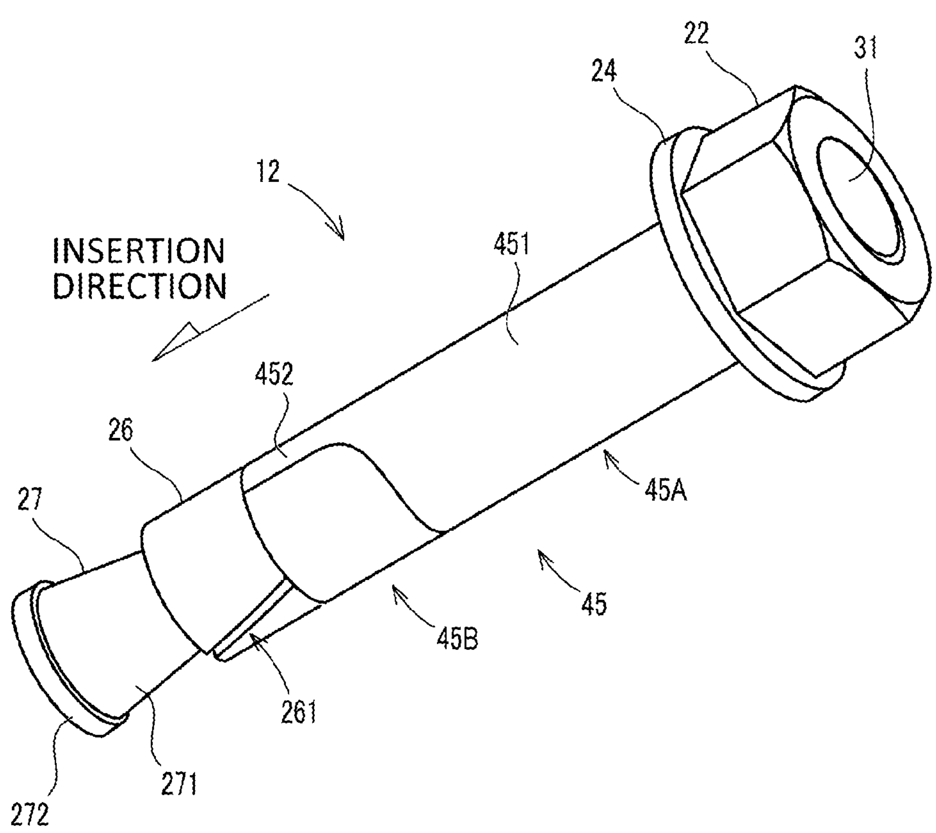

【FIG. 17A】
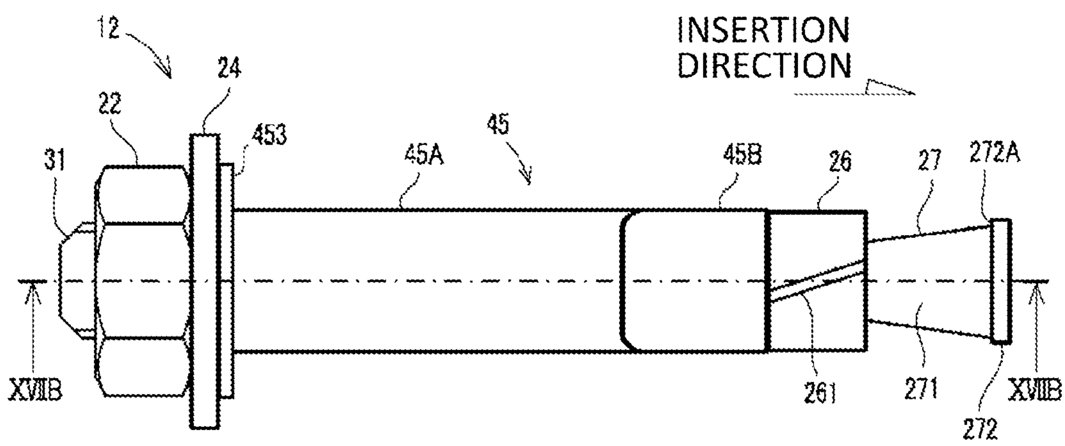

【ＦＩＧ．１７Ｂ】
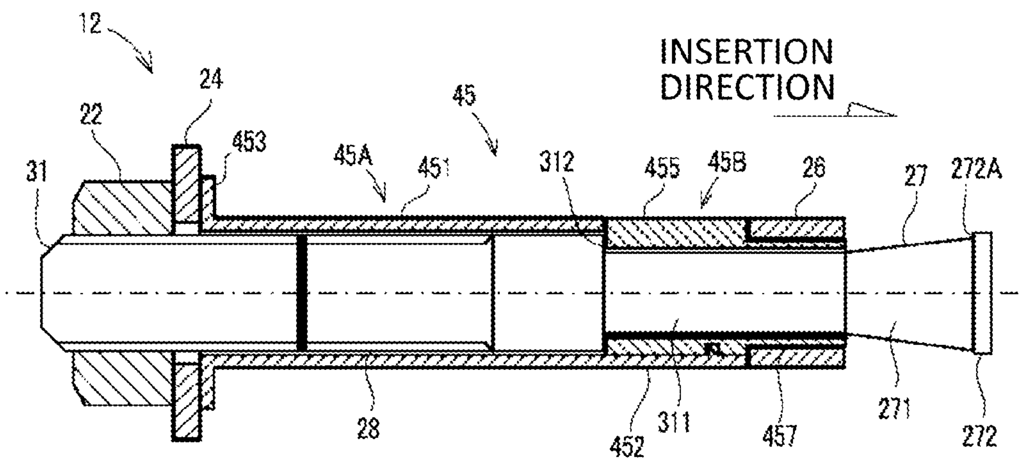

【FIG. 18】
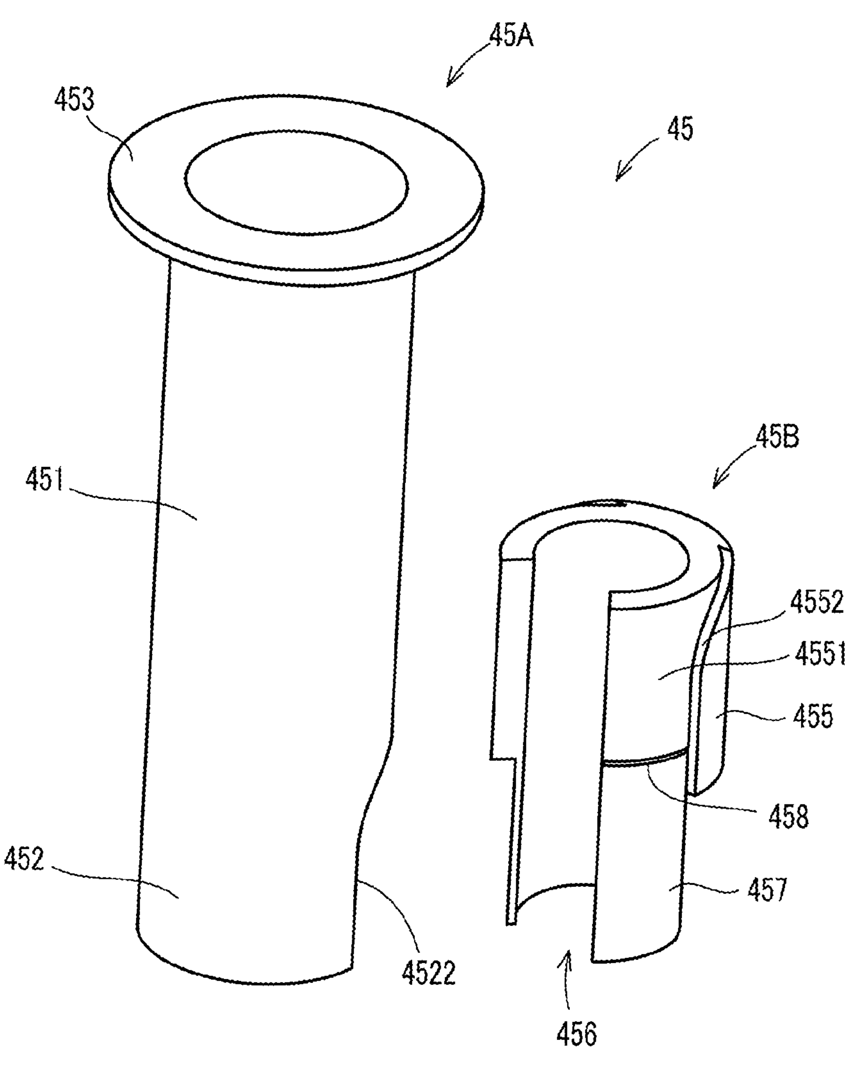

【FIG. 19】
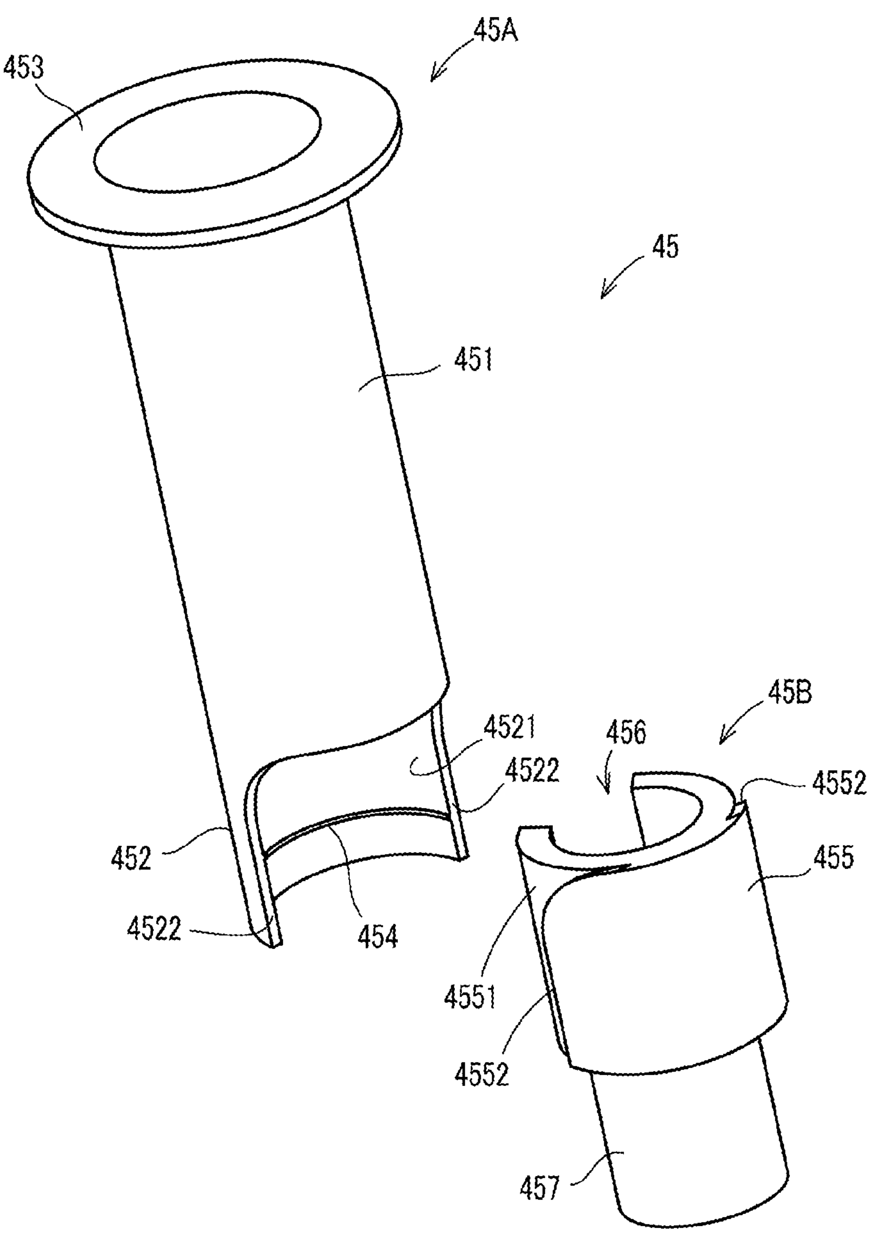

ANCHOR BOLT

TECHNICAL FIELD

The present disclosure relates to an anchor bolt that is fixed in an anchor hole formed in a skeleton such as concrete.

BACKGROUND ART

Conventionally, there is known, as an anchor bolt configured to be fixed in a skeleton such as concrete, an anchor bolt that includes: a tubular member having an expansively openable portion having a plurality of longitudinal slits at its tip; and a bolt that is inserted in the tubular member. In addition, there has been proposed an anchor bolt that includes, at its tip, an expansively openable portion formed by binding, with a binding thread or an elastic ring, a plurality of expansively openable pieces divided in a peripheral direction (see PTL 1 and PTL 2).

CITATION LIST

Patent Literature

[PTL 1] Japanese Patent Application Publication No. H4-249608

[PTL 2] Japanese Patent Application Publication No. 2003-268884

SUMMARY OF THE INVENTION

Problems to be Solved by the Invention

However, according to the conventional anchor bolt, since it has the plurality of expansively openable pieces divided in the peripheral direction, when an inclined surface of a cone portion expands the expansively openable portion, the expansively openable pieces are expanded outward. As a result, gaps are formed between the expansively openable pieces. For example, when the anchor bolt has two expansively openable pieces, two gaps are formed between the two expanded expansively openable pieces. In this case, at the inner peripheral surface of the anchor hole, each expansively openable piece bites a part of an inner wall that faces that expansively openable piece. However, the expansively openable pieces cannot bite parts that face the gaps. Accordingly, a sufficient pull-off strength cannot be obtained with the conventional anchor bolt.

The present disclosure has been made in view of such conventional circumstances, and it is an object of the present disclosure to provide an anchor bolt that enhances the pull-off strength.

Solution to the Problems

An anchor bolt according to an aspect of the present disclosure is an anchor bolt configured to be fixed in an anchor hole formed in a skeleton. The anchor bolt includes: a bolt main body, with a screw thread formed on an outer peripheral surface thereof, including an insertion portion that is inserted in the anchor hole; a tubular member that is attached to the bolt main body and includes a locking portion configured to be, in a state of being disposed in the anchor hole, locked to an inner side surface of the anchor hole; an annular expansively openable member attached to the bolt main body at a position closer to a tip side of the anchor bolt than the tubular member, and divided in a peripheral direction; and a push-in portion configured to expand the expansively openable member radially outward by being pushed into an inner hole of the expansively openable member.

With the above-described configuration, it is possible to minimize noncontact part of the expansively openable member that is not in contact with an inner wall of the anchor hole. As a result, it is possible to enhance the pull-off strength of the anchor bolt.

Advantageous Effects of the Invention

According to the present disclosure, it is possible to enhance the pull-off strength of the anchor bolt by minimizing the noncontact part of the expansively openable member that is not in contact with the inner wall of the anchor hole.

BRIEF DESCRIPTION OF THE DRAWINGS

FIG. 1 is a perspective diagram showing an anchor bolt 11 according to a first embodiment of the present disclosure.

FIG. 2 is a perspective diagram showing the anchor bolt 11 according to the first embodiment of the present disclosure.

FIG. 3A is a side diagram of the anchor bolt 11.

FIG. 3B is a partial cross-sectional diagram of the anchor bolt 11.

FIG. 4A is a diagram showing an expansively openable ring to be attached to the anchor bolt 11.

FIG. 4B is a diagram showing the expansively openable ring to be attached to the anchor bolt 11.

FIG. 5A is a diagram showing a process of inserting the anchor bolt 11 into an anchor hole.

FIG. 5B is a diagram showing a state where the anchor bolt 11 has been inserted into the anchor hole.

FIG. 5C is a diagram showing a fixed state where a nut of the anchor bolt 11 has been tightened and the construction is completed.

FIG. 6A is a diagram showing a modification 1 of the expansively openable ring of the anchor bolt 11.

FIG. 6B is a diagram showing a modification 2 of the expansively openable ring of the anchor bolt 11.

FIG. 6C is a diagram showing a modification 3 of the expansively openable ring of the anchor bolt 11.

FIG. 7 is a side diagram showing another example of the anchor bolt 11.

FIG. 8 is a side diagram showing a still another example of the anchor bolt 11.

FIG. 9 is a perspective diagram showing an anchor bolt 12 according to a second embodiment of the present disclosure.

FIG. 10A is a side diagram of the anchor bolt 12.

FIG. 10B is a partial cross-sectional diagram of the anchor bolt 12, and is a cross-sectional diagram taken along A-A of FIG. 10A.

FIG. 11A is a diagram showing a sleeve to be attached to the anchor bolt 12.

FIG. 11B is a diagram showing the sleeve to be attached to the anchor bolt 12.

FIG. 12A is a diagram showing a process of inserting the anchor bolt 12 into an anchor hole.

FIG. 12B is a diagram showing a state where the anchor bolt 12 has been inserted into the anchor hole.

FIG. 12C is a diagram showing a fixed state where a nut of the anchor bolt 12 has been tightened and the construction is completed.

FIG. 13 is a perspective diagram showing an anchor bolt 13 according to a third embodiment of the present disclosure.

FIG. 14A is a side diagram of the anchor bolt 13.

FIG. 14B is a partial cross-sectional diagram of the anchor bolt 13.

FIG. 15A is a diagram showing a process of inserting the anchor bolt 13 into an anchor hole.

FIG. 15B is a diagram showing a state where the anchor bolt 13 has been inserted into the anchor hole.

FIG. 15C is a diagram showing a fixed state where a bolt of the anchor bolt 13 has been tightened and the construction is completed.

FIG. 16 is a perspective diagram showing an anchor bolt 14 according to a fourth embodiment of the present disclosure.

FIG. 17A is a side diagram of the anchor bolt 14.

FIG. 17B is a partial cross-sectional diagram of the anchor bolt 14, showing a cross-section of a cut surface XVIIB-XVIIB of FIG. 17A.

FIG. 18 is a perspective diagram showing a sleeve to be attached to the anchor bolt 14.

FIG. 19 is a perspective diagram showing the sleeve to be attached to the anchor bolt 14.

DESCRIPTION OF EMBODIMENTS

The following describes embodiments of the present disclosure with reference to the accompanying drawings. It should be noted that the following embodiments are examples of specific embodiments of the present disclosure and should not limit the technical scope of the present disclosure.

First Embodiment

FIG. 1 and FIG. 2 are perspective diagrams showing an anchor bolt 11 according to a first embodiment of the present disclosure. The anchor bolt 11 of the present embodiment is a bolt called as a post-constructed anchor that is attached to a skeleton 90 (see FIG. 5A) such as cured mortar or concrete. It is noted that the skeleton 90 to which the anchor bolt 11 is constructed may be a ceiling, a side wall, or a floor surface.

As shown in FIG. 1 and FIG. 2, the anchor bolt 11 includes a taper bolt 21 (an example of a bolt main body of the present disclosure), a nut 22, a spring washer 23 (see FIG. 2), a flat washer 24, a sleeve 25 (an example of a tubular member of the present disclosure), an expansively openable ring 26 (an example of an expansively openable member of the present disclosure), and a cone portion 27 (an example of a push-in portion of the present disclosure). It is noted that the nut 22, the spring washer 23, and the flat washer 24 are not essential constituent elements of the anchor bolt of the present disclosure but are elements necessary for the attachment construction of the anchor bolt 11.

FIG. 3A and FIG. 3B are diagrams showing a configuration of the anchor bolt 11. FIG. 3A is a side diagram, and FIG. 3B is a partial cross-sectional diagram. FIG. 3B shows a cross-sectional structure of members other than a taper bolt 21.

As shown in FIG. 3A and FIG. 3B, the taper bolt 21 is a bolt with a male screw formed on its outer peripheral surface, and its tip is integrally formed with the cone portion 27. The male screw is formed from a top toward the tip of the taper bolt 21, a part of a top side of a screw portion 28 thereof is exposed to outside, and a tip side of the taper bolt 21 is inserted into an anchor hole 91 (see FIG. 5A) formed in the skeleton 90.

The taper bolt 21 is formed from a steel material such as carbon steel or stainless steel. It is noted that when the taper bolt 21 is formed from carbon steel containing iron as its main component, it may be treated with a molten zinc plating to prevent rusting or corrosion.

The cone portion 27 is configured to expand the expansively openable ring 26 radially outward by being pushed into the inner hole of the expansively openable ring 26, and is formed in an approximately truncated cone shape. The cone portion 27 is formed in shape widening toward a tip of the taper bolt 21 such that the outer diameter of a part having the minimum diameter of an outer peripheral surface 271 of the cone portion 27 is smaller than the inner diameter of the expansively openable ring 26, and the outer diameter of a part having the maximum diameter of the outer peripheral surface 271 is larger than the inner diameter of the expansively openable ring 26.

A tip side of the cone portion 27 is integrally formed with a protruding portion 272 of an annular shape that protrudes radially outward from the outer peripheral surface 271 of the cone portion 27. For this reason, a step 272A is formed between the outer peripheral surface 271 and the protruding portion 272. Since the cone portion 27 is inserted in the anchor hole 91 during the attachment construction of the anchor bolt 11, the outer diameter of the protruding portion 272 is smaller than the inner diameter of the anchor hole 91. That is, the anchor hole 91 formed in the skeleton 90 has a prescribed size that is larger than the maximum diameter of the cone portion 27 (the outer diameter of the protruding portion 272).

The sleeve 25 is a tubular member formed in an approximately cylindrical shape. The sleeve 25 is attached to the taper bolt 21. Specifically, the screw portion 28 of the taper bolt 21 is inserted into an inner hole of the sleeve 25, and in this state, the flat washer 24 and the spring washer 23 are sequentially inserted onto a top side of the screw portion 28, and further the nut 22 is screwed onto the screw portion 28. The inner diameter of the inner hole of the sleeve 25 is slightly larger than the outer diameter of the screw portion 28 and the minimum diameter of the cone portion 27, and smaller than the maximum diameter of the cone portion 27.

The sleeve 25 is formed from a material that is lower in hardness than the cone portion 27 and the expansively openable ring 26. In the present embodiment, the sleeve 25 is formed from a synthetic resin that is lower in hardness than the cone portion 27 and the expansively openable ring 26. In the present embodiment, the sleeve 25 is manufactured by forming the synthetic resin with a mold. Examples of the synthetic resin include polyethylene, polypropylene, polystyrene, ABS resin, acrylic resin, polyvinyl chloride, polyamide, polyacetal, polycarbonate, polyethylene terephthalate (PET resin), and a synthetic resin containing one or more of these as its main component(s). These synthetic resins are lower in hardness than the skeleton 90, namely, are lower in hardness than an inner wall of the anchor hole 91 formed in the skeleton 90.

It is noted that the sleeve 25 is not limited to one formed from a synthetic resin, but may be formed from a metal material such as: a metal such as aluminum or copper that is lower in hardness than the cone portion 27 and the expansively openable ring 26; or an alloy containing the metal as its main component. In addition, when the sleeve 25 is formed from the metal material, the metal material is preferably lower in hardness than the inner wall of the anchor hole 91 formed in the skeleton 90.

The sleeve 25 includes a tube main body portion 251 (an example of a tube main body portion of the present disclosure) formed in a cylindrical shape, one or more locking pieces 252 (an example of a locking portion of the present disclosure), one or more slits 253 (an example of a slit of the present disclosure), and a small diameter tube portion 254 (an example of a small diameter tube portion of the present disclosure). These portions are integrally formed with the sleeve 25.

The locking pieces 252 are, in a state where the anchor bolt 11 is inserted in the anchor hole 91 of the prescribed size and is disposed inside the anchor hole 91, locked to an inner side surface of the anchor hole 91. The locking pieces 252 are inclined ribs provided at a top end of the tube main body portion 251, and protruding perpendicularly from the outer peripheral surface of the tube main body portion 251. The locking pieces 252 are inclined such that a top side thereof is the highest and a tip side is low. In the present embodiment, four locking pieces 252 are formed on the outer peripheral surface of the tube main body portion 251, and are arranged at equal intervals in the peripheral direction. A length H1 (see FIG. 3A) between the center of the tube main body portion 251 and the locking pieces 252 is longer than the radius of the anchor hole 91. That is, the inner diameter of the anchor hole 91 is smaller than the maximum diameter of the sleeve 25, and larger than the maximum diameter of the taper bolt 21 (the outer diameter of the protruding portion 272). For this reason, when the anchor bolt 11 is inserted and pushed into the anchor hole 91, the four locking pieces 252 come in contact with and press the inner side surface of the anchor hole 91, and the sleeve 25 is fixed in the anchor hole 91.

It is noted that the number of the locking pieces 252 is not limited to four. The number of the locking pieces 252 may be two or three, or may be five or more. In addition, although the locking pieces 252 have been explained as one example of the locking portion of the present disclosure, the locking portion of the present disclosure is not limited to the locking pieces 252. For example, instead of the locking pieces 252, an annular inclined portion formed continually in the peripheral direction on the outer peripheral surface of the tube main body portion 251 may be applied.

The small diameter tube portion 254 is provided at the tip side of the tube main body portion 251. The small diameter tube portion 254 is a cylindrical part extending from the tube main body portion 251 towards the tip. The inner diameter of the small diameter tube portion 254 is equal in size to the inner diameter of the tube main body portion 251, but the outer diameter of the small diameter tube portion 254 is smaller than the outer diameter of the tube main body portion 251. As a result, a step 251A is formed at the boundary between the tube main body portion 251 and the small diameter tube portion 254.

The expansively openable ring 26 is attached to the small diameter tube portion 254 so as to cover the outer peripheral surface of the small diameter tube portion 254. Thus, as shown in FIG. 3B, the small diameter tube portion 254 is disposed between the inner surface of the expansively openable ring 26 and the outer peripheral surfaces of the taper bolt 21 and the cone portion 27.

The expansively openable ring 26 is expanded radially outward when the cone portion 27 is inserted in its inner hole during the attachment construction of the anchor bolt 11. In the present embodiment the expansively openable ring 26 is expanded to be larger in size than the inner diameter of the anchor hole 91.

The expansively openable ring 26 is an annularly formed member. The expansively openable ring 26 is formed from a steel material such as carbon steel or stainless steel. The expansively openable ring 26 is attached closer to the tip side of the taper bolt 21 than the tube main body portion 251 of the sleeve 25. Specifically, the expansively openable ring 26 is attached to the small diameter tube portion 254.

The inner diameter of the expansively openable ring 26 before expansion is approximately equal in size to the outer diameter of the small diameter tube portion 254. For this reason, the expansively openable ring 26 is attached to the small diameter tube portion 254 in a state where its inner surface is in close contact with the outer peripheral surface of the small diameter tube portion 254. In a state where the expansively openable ring 26 is attached to the small diameter tube portion 254, the sleeve 25 is inserted onto the screw portion 28 of the taper bolt 21.

FIG. 4A and FIG. 4B are diagrams showing the expansively openable ring 26 before expansion. As shown in FIG. 4A and FIG. 4B, the expansively openable ring 26 is an annular member, and specifically is a cylindrical member in which a height size L1 in a center axis direction is relatively small with respect to an outer diameter D1 of the expansively openable ring 26. In the present embodiment, the height size L1 of the expansively openable ring 26 is set to a length that is approximately 0.4 to 0.5 times the outer diameter D1. It is noted that the height size L1 of the expansively openable ring 26 only needs to be smaller than the outer diameter D1, and is preferably equal to or smaller than a size that is 0.5 times the outer diameter D1.

The expansively openable ring 26 is not an annular member that completely continues in the peripheral direction, but is divided in the peripheral direction by a slit 261 (an example of a dividing line of the present disclosure) of a predetermined width d. In other words, the expansively openable ring 26 includes the slit 261 that divides the member in the peripheral direction. The slit 261 is spread when the anchor bolt 11 is fixed to the anchor hole 91. It is noted that the expansively openable ring 26 is not limited to the configuration where it is completely divided in the peripheral direction by the slit 261. For example, a central part or an end part of the slit 261 may be partially connected, and the connected portion may be divided when the cone portion 27 is pushed therein. That is, the expansively openable ring 26 may be approximately divided in the peripheral direction, while partially connected.

The expansively openable ring 26, for example, may be formed by cutting an outer peripheral wall of an annular cylindrical member. In this case, the cut line becomes the slit 261. In addition, the expansively openable ring 26 may be formed by bending a plate-like or bar-like member by using a bending device or the like. In this case, a part where ends of the member have been joined becomes the slit 261.

The size of the width d of the slit 261 is not particularly limited. As described below, the slit 261 is spread during the construction of the anchor bolt 11. As a result, the width d is preferably substantially zero before the construction.

In the present embodiment, the slit 261 of the expansively openable ring 26 is inclined in a state (the state shown in FIG. 4A) where the expansively openable ring 26 is viewed from a side. That is, the slit 261 diagonally extends from a first end portion 262 (an example of a first end portion of the present disclosure) that appears at one side (for example, the right side of FIG. 4A) of the expansively openable ring 26 to a second end portion 263 (an example of a second end portion of the present disclosure) that appears at the other side. Accordingly, the first end portion 262 and the second end portion 263 are separated from each other in the peripheral direction of the expansively openable ring 26.

It is noted that the expansively openable ring 26 is not limited to a cylindrical member. For example, it may be an annular ring member whose cross-sectional shape is circular, oval, polygonal, square, equilateral triangular, or the like.

An inclination angle θ of the slit 261 only needs to be set to an angle where, as shown in FIG. 4B, the first end portion 262 and the second end portion 263 do not overlap with each other when viewed from the axial direction of the expansively openable ring 26 in a state where the expansively openable ring 26 has been expanded after the attachment construction of the anchor bolt 11. The inclination angle θ as such is determined by the width of the expansively openable ring 26, an outer diameter of the expanded expansively openable ring 26, or the like.

As shown in FIG. 3B, the slits 253 each having a predetermined width are formed in the sleeve 25. The slits 253 each extend straight from an end of the small diameter tube portion 254 on the tip side towards the top of the anchor bolt 11. In the present embodiment, the slits 253 extend from the small diameter tube portion 254 to the tube main body portion 251 and reach near the center of the tube main body portion 251. In addition, in the present embodiment, four slits 253 are formed in the sleeve 25 and arranged at equal intervals in the peripheral direction. The slits 253 formed as such provide flexibility to tip side parts of the small diameter tube portion 254 and the tube main body portion 251.

It is noted that the number of the slits 253 is not limited to four. The number of the slits 253 may be two or three, or may be five or more. In addition, the slits 253 may be formed at least in the small diameter tube portion 254. In addition, the slits 253 may extend in a direction that is inclined with respect to a center axis of the sleeve 25.

The following describes an attachment structure of the anchor bolt 11 with reference to FIG. 5A to FIG. 5C. Here, FIG. 5A is a diagram showing a state where the sleeve 25 of the anchor bolt 11 is inserted in the anchor hole 91, FIG. 5B is a diagram showing a state where the nut 22 is screw-fitted to the anchor bolt 11, and FIG. 5C is a diagram showing a fixed state where the nut 22 of the anchor bolt 11 has been tightened and the attachment construction is completed. It is noted that the slits 253 are omitted in FIG. 5A to FIG. 5C.

To construct the anchor bolt 11, first, beforehand, the constructor needs to form the anchor hole 91 in the skeleton 90. After the anchor hole 91 is formed in the skeleton 90 and its interior is cleaned, the constructor inserts the anchor bolt 11 with the nut 22 and the washers 23 and 24 attached thereto, into an attachment hole 81 of a structural member 80, and into the anchor hole 91 (see FIG. 5A). At this time, the constructor pushes the sleeve 25 into the anchor hole 91 until the upper end of the sleeve 25 becomes flush with the surface of the skeleton 90 (see FIG. 5B). This allows the locking pieces 252 of the sleeve 25 to be pressed against the inner surface of the anchor hole 91, and the sleeve 25 is fixed in the anchor hole 91. At this point in time, a part of the screw portion 28 of the taper bolt 21 protrudes outside from the skeleton 90.

It is noted that since, as described above, the sleeve 25 is formed from a synthetic resin, not from a metal, the sleeve 25 can be pushed into the anchor hole 91 with a weaker force than one made from a metal is. In addition, when the locking pieces 252 of the sleeve 25 are pressed against the inner wall surface of the anchor hole 91, the locking pieces 252 are collapsed, and thereby the sleeve 25 is fixed in the anchor hole 91. As a result, the sleeve 25 can be fixed by applying an extremely smaller load to the inner wall surface of the anchor hole 91 than a conventional one. As a result, it is possible to prevent a crack from occurring in the inner wall surface of the anchor hole 91 when the sleeve 25 is inserted therein.

Subsequently, the constructor tightens the nut 22 by a predetermined torque by using an electric or air driving impact wrench or the like (see FIG. 5C). This pulls up only the taper bolt 21, and inside the anchor hole 91, pulls up the cone portion 27 together with the taper bolt 21. As the cone portion 27 is pulled up, the cone portion 27 is pressed into the inner hole of the expansively openable ring 26. Specifically, the cone portion 27 is pressed into the inner hole of the small diameter tube portion 254. This causes the expansively openable ring 26 to be expanded radially outward by the inclination of the outer peripheral surface 271 of the cone portion 27 (see FIG. 5C). The expanded expansively openable ring 26 bites into the inner wall surface of the anchor hole 91 and is fixed therein. This causes the anchor bolt 11 to be fixed in the anchor hole 91. In addition, tightening the nut 22 causes the structural member 80 to be firmly attached to the skeleton 90 by the anchor bolt 11.

With the above-described configuration of the anchor bolt 11 of the present embodiment, the outer peripheral surface of the expansively openable ring 26 expanded by the cone portion 27 comes in contact with the inner wall surface of the anchor hole 91, and the expansively openable ring 26 bites into the inner wall surface. At this time, the cone portion 27 is pressed into the inner hole, and the slit 261 is spread. However, since the slit 261 diagonally extends, the expansively openable ring 26 contacts the inner wall surface of the anchor hole 91 continually in the peripheral direction. That is, the outer peripheral surface of the expansively openable ring 26 and the inner wall surface come in contact with each other over the whole range of 360 degrees of the inner wall surface (the whole range of the peripheral direction), and in this range, there is no noncontact part where the outer peripheral surface of the expansively openable ring 26 and the inner wall surface are not in contact with each other. This enhances the pull-off strength of the anchor bolt 11 after the construction.

In addition, since the small diameter tube portion 254 is interposed between the inner peripheral surface of the expansively openable ring 26 and the outer peripheral surface of the cone portion 27, when the cone portion 27 is pressed into the inner hole of the small diameter tube portion 254 and a strong force acts on the small diameter tube portion 254, the small diameter tube portion 254 is collapsed and spread. With this configuration, a very small gap between the expansively openable ring 26 and the cone portion 27 is filled and the inner peripheral surface of the expansively openable ring 26 and the outer peripheral surface of the cone portion 27 are brought into close contact with each other. As a result, sliding is hardly caused between the expansively openable ring 26 and the cone portion 27.

In addition, since the small diameter tube portion 254 is formed from a material that is lower in hardness than the expansively openable ring 26, the small diameter tube portion 254 is brought into close contact between the cone portion 27 and the expansively openable ring 26, and the small diameter tube portion 254 takes a role of a slip-stop. Accordingly, even if a force in the peripheral direction is applied to the cone portion 27, the cone portion 27 does not slide in the peripheral direction with respect to the small diameter tube portion 254 and the expansively openable ring 26. In addition, the expansively openable ring 26 does not slide in the peripheral direction with respect to the small diameter tube portion 254 and the sleeve 25. That is, the small diameter tube portion 254 takes a role of preventing the rotation of the cone portion 27 and the expansively openable ring 26.

In addition, the cone portion 27 includes the protruding portion 272. Accordingly, when the anchor bolt 11 is pulled up, the protruding portion 272 abuts on an end of the small diameter tube portion 254. This stops the outer peripheral surface 271 of the cone portion 27 from expanding the expansively openable ring 26. That is, the expansively openable ring 26 is no more expanded radially outward. Since the protruding portion 272 as such is provided, even when the tightening torque of the nut 22 is smaller than a setting torque of an impact wrench or the like in a state where the expansively openable ring 26 has been expanded to a maximum by the outer peripheral surface 271 of the cone portion 27, the protruding portion 272 comes in contact with the end of the small diameter tube portion 254, and this increases the tightening torque. This allows the tightening torque to exceed the setting torque and stops the nut 22 from being tightened by the impact wrench or the like, and the expansively openable ring 26 is no more expanded. As a result, the expansively openable ring 26 is prevented from excessively biting into the inner wall of the anchor hole 91, and it is possible to prevent a crack from occurring to the skeleton 90 due to an excessive biting.

In addition, since the sleeve 25 includes the small diameter tube portion 254, and the expansively openable ring 26 is attached to the small diameter tube portion 254, the expansively openable ring 26 is stably supported by the sleeve 25.

In addition, since the sleeve 25 is formed from a material, specifically the above-described synthetic resin, that is lower in hardness than the inner wall of the anchor hole 91 formed in the skeleton 90, the constructor can easily attach the sleeve 25 to the anchor hole 91 without strongly striking the taper bolt 21 into the anchor hole 91 with a hammer. In addition, since it is possible to fix the structural member 80 to the anchor bolt 11 only by tightening the nut 22 with an impact wrench or the like, the workability is improved.

In addition, since the locking pieces 252 apply only a very small load to the inner wall surface of the anchor hole 91 when the sleeve 25 is inserted, it is prevented that, as in a conventional product, a metal part of the outer peripheral surface bites into the inner wall surface of the anchor hole 91 to cause a crack in the inner wall surface. In addition, since a small load is applied to the inner wall surface, it is possible to construct the anchor bolt 11 at a position close to an edge of the skeleton 90, compared to a conventional product.

It is noted that although the above-described embodiment explains an example in which the slit 261 of the expansively openable ring 26 diagonally extends, the shape of the slit 261 is not limited to the example. For example, as shown in FIG. 6A, the expansively openable ring 26 may be divided by a slit 261A that extends straight in parallel with the central axis of the expansively openable ring 26. In this case, although the expansively openable ring 26 after the expansion has a part, namely, the slit 261 having the width d, that does not contact the inner wall of the anchor hole 91, it has very little noncontact part compared to one with a conventional structure. That is, it has much more part that bites in the peripheral direction compared to a conventional one. Accordingly, even the expansively openable ring 26 of this configuration can enhance the pull-off strength of the anchor bolt 11 after the construction.

In addition, the expansively openable ring 26 may be divided by a slit 261B that includes a plurality of bending points (see FIG. 6B), or may be divided by a slit 261C that is curved in the shape of letter S (see FIG. 6C). In this case, the first end portion 262 and the second end portion 263 are separated from each other in the peripheral direction of the expansively openable ring 26. Even with this configuration, the outer peripheral surface of the expansively openable ring 26 comes in contact with the inner wall surface of the anchor hole 91 continually in the peripheral direction. This enhances the pull-off strength of the anchor bolt 11 after the construction.

In addition, as shown in FIG. 7, the anchor bolt 11 may include, instead of the sleeve 25, a sleeve 25A that does not include the small diameter tube portion 254. In this case, the thickness of the expansively openable ring 26 is increased by the thickness of the small diameter tube portion 254, and is approximately the same as the thickness of the tube main body portion 251. Even with this configuration, the outer peripheral surface of the expansively openable ring 26 comes in contact with the inner wall surface of the anchor hole 91 continually in the peripheral direction. This enhances the pull-off strength of the anchor bolt 11 after the construction.

In addition, although, as described above, the present embodiment has a configuration where the anchor bolt 11 includes the expansively openable ring 26 that includes the slit 261, the present disclosure is not limited to this configuration. For example, as shown in FIG. 8, the anchor bolt 11 may include, instead of the expansively openable ring 26, a conventional, tubular, expansively openable member 26A that includes a plurality of longitudinal slits at its tip, and is not divided in the peripheral direction. Even with this configuration, since the small diameter tube portion 254 is interposed between the inner peripheral surface of the expansively openable member 26A and the outer peripheral surface of the cone portion 27, sliding is hardly caused between the expansively openable member 26A and the cone portion 27.

It is noted that the above-described modifications of the first embodiment and other examples may be applied to second, third, and fourth embodiments described below.

Second Embodiment

The following describes, with reference to FIG. 9 to FIG. 12C, a configuration of an anchor bolt 12 according to a second embodiment of the present disclosure. Here, FIG. 9 is a perspective diagram showing the anchor bolt 12. FIG. 10A is a side diagram of the anchor bolt 12, and FIG. 10B is a partial cross-sectional diagram of the anchor bolt 12. FIG. 10B shows a cross-sectional structure of members other than a taper bolt 31. In addition, FIG. 11A and FIG. 11B are diagrams showing a sleeve 35 attached to the anchor bolt 12.

It is noted that in the present embodiment, reference signs assigned to the above-described configurations of the first embodiment are also assigned to such configurations that are common to or cause substantially the same acts as those of the first embodiment, and description thereof is omitted.

As shown in FIG. 9, the anchor bolt 12 includes the taper bolt 31 (an example of the bolt main body of the present disclosure), the nut 22, the flat washer 24, the sleeve 35 (an example of the tubular member of the present disclosure), the expansively openable ring 26 (an example of the expansively openable member of the present disclosure), and the cone portion 27 (an example of the push-in portion of the present disclosure).

As shown in FIG. 10A, the taper bolt 31 is a bolt with a male screw formed on its outer peripheral surface, and its tip is integrally formed with the cone portion 27. The male screw is formed from a top toward the tip of the taper bolt 31, a part of a top side of the screw portion 28 thereof is exposed to outside, and a tip side of the taper bolt 31 is inserted in the anchor hole 91 (see FIG. 12A) formed in the skeleton 90.

The taper bolt 31 differs from the above-described taper bolt 21 of the first embodiment in that the taper bolt 31 includes a support portion 311 that is used to attach the sleeve 35 to the taper bolt 31. Otherwise, the taper bolt 31 has the same configuration as the taper bolt 21. The support portion 311 has a circular cross section smaller in diameter than the outer diameter of the screw portion 28, and is formed between the screw portion 28 and the cone portion 27. Since the support portion 311 is smaller in diameter than the screw portion 28, a step 312 is formed between the support portion 311 and the screw portion 28.

The cone portion 27 is provided at a tip side of the support portion 311. The outer diameter of a part of an outer peripheral surface of the cone portion 27 having the minimum diameter is the same in size as the outer diameter of the support portion 311, and the outer diameter of a part of the outer peripheral surface of the cone portion 27 having the maximum diameter (the protruding portion 272) is the same in size as the outer diameter of the screw portion 28.

As shown in FIG. 10B, the sleeve 35 is a tubular member formed in an approximately cylindrical shape. The sleeve 35 is attached to the taper bolt 31, and specifically, is attached to the support portion 311 of the taper bolt 31. The sleeve 35 is formed from the same material as the sleeve 25 of the first embodiment, namely, a synthetic resin.

The sleeve 35 differs from the sleeve 25 of the first embodiment in that, as shown in FIG. 11A and FIG. 11B, it is substantially divided into two and that it includes a plurality of locking ribs 352 instead of the locking pieces 252. Otherwise, the sleeve 35 has the same configuration as the sleeve 25.

The sleeve 35 includes a tube main body portion 351 (an example of the tube main body portion of the present disclosure) formed in a cylindrical shape, one or more locking ribs 352 (an example of the locking portion of the present disclosure), and the small diameter tube portion 254 (an example of the small diameter tube portion of the present disclosure). These portions are integrally formed with the sleeve 35. It is noted that although the above-described slits 253 are not formed in the sleeve 35, slits similar to the slits 253 may be formed in the sleeve 35.

The sleeve 35 includes two members 351A and 351B that are each formed in a semi-cylindrical shape. The members 351A and 351B are fitted together to form the sleeve 35 in an approximately cylindrical shape. In the present embodiment, in a state where the sleeve 35 is separated in two, an inner side surface of one member 351A is brought into contact with a surface of the support portion 311, and in this state, the other member 351B is attached to the support portion 311. A side end of the member 351A and a side end of the member 351B are connected to each other by two connecting portions 353 of a thin-walled band-like shape.

Each of contact surfaces of the members 351A and 351B that are to be fitted together is provided with an engagement groove 354 and an engagement projection 355. When the members 351A and 351B are fitted together, the engagement projection 355 is inserted in the engagement groove 354, and they are engaged with each other by a snap-fit mechanism.

The locking ribs 352 are configured to be locked to an inner side surface of the anchor hole 91 in a state where the anchor bolt 12 is inserted in the anchor hole 91 of the prescribed size and arranged in the anchor hole 91. The locking ribs 352 extend in the axial direction on the outer peripheral surface of the tube main body portion 351. Specifically, the locking ribs 352 extend from one end to the other end in the axial direction of the tube main body portion 351. The locking ribs 352 protrude perpendicularly from the peripheral surface of the tube main body portion 351, and each have an inclined surface at its tip side. In the present embodiment, six locking ribs 352 are formed and arranged at equal intervals in the peripheral direction on the outer peripheral surface of the tube main body portion 351. A length H2 (see FIG. 10B) between the center of the tube main body portion 351 and the locking ribs 352 is longer than the radius of the anchor hole 91. That is, the inner diameter of the anchor hole 91 is smaller than the maximum diameter of the sleeve 35, and larger than the maximum diameter of the taper bolt 31 (the outer diameter of the screw portion 28, the outer diameter of the protruding portion 272). As a result, when the anchor bolt 12 is inserted and pushed into the anchor hole 91, the six locking ribs 352 come in contact with and press the inner side surface of the anchor hole 91, and the sleeve 35 is fixed in the anchor hole 91.

It is noted that the number of the locking ribs 352 is not limited to six. The number of the locking ribs 352 may be two, three, four, or five, or seven or more.

The following describes an attachment structure of the anchor bolt 12 with reference to FIG. 12A to FIG. 12C. Here, FIG. 12A is a diagram showing a state where the sleeve 35 of the anchor bolt 12 is inserted in the anchor hole 91, FIG. 12B is a diagram showing a state where the nut 22 is screw-fitted to the anchor bolt 12, and FIG. 12C is a diagram showing a fixed state where the nut 22 of the anchor bolt 12 has been tightened and the attachment construction is completed.

To construct the anchor bolt 12, the constructor inserts the anchor bolt 11 with the nut 22 and the washer 24 attached thereto, into the attachment hole 81 of the structural member 80, and into the anchor hole 91 (see FIG. 12A). Subsequently, the sleeve 35 is pushed into the anchor hole 91 until the sleeve 35 is arranged at a predetermined position in the anchor hole 91 (see FIG. 12B). Since the sleeve 35 is formed from a material that is softer than the structural member 80 and the inner wall of the anchor hole 91 (namely, the skeleton 90), the constructor can push in the sleeve 35 up to the predetermined position by, for example, lightly striking the top of the taper bolt 31 with a plastic hammer or the like. At this point in time, a part of the screw portion 28 of the taper bolt 31 protrudes outside from the skeleton 90.

It is noted that since, as described above, the sleeve 35 is formed from a synthetic resin that is softer than the skeleton 90, not from a metal, the sleeve 35 can be driven into the anchor hole 91 with a weaker force than a metal one is. In addition, when the locking ribs 352 of the sleeve 35 are pressed against the inner wall surface of the anchor hole 91, the locking ribs 352 are collapsed, and thereby the sleeve 35 is fixed in the anchor hole 91. As a result, the sleeve 35 can be fixed by applying an extremely smaller load to the inner wall surface of the anchor hole 91 than a conventional one. As a result, it is possible to prevent a crack from occurring in the inner wall surface of the anchor hole 91 when the sleeve 35 is driven thereinto.

Subsequently, the constructor tightens the nut 22 by a predetermined torque by using an electric or air driving impact wrench or the like (see FIG. 12C). This pulls up only the taper bolt 31, and inside the anchor hole 91, pulls up the cone portion 27 together with the taper bolt 31. As the cone portion 27 is pulled up, the cone portion 27 is pressed into the inner hole of the expansively openable ring 26. Specifically, the cone portion 27 is pressed into the inner hole of the small diameter tube portion 254. This causes the expansively openable ring 26 to be expanded radially outward by the inclination of the outer peripheral surface 271 of the cone portion 27 (see FIG. 12C). The expanded expansively openable ring 26 bites into the inner wall surface of the anchor hole 91 and is fixed therein. This causes the anchor bolt 12 to be fixed in the anchor hole 91. In addition, tightening the nut 22 causes the structural member 80 to be firmly attached to the skeleton 90 by the anchor bolt 12.

With the above-described configuration, the anchor bolt 12 of the present embodiment exhibits the same effect as the anchor bolt 11 of the first embodiment.

In particular, since the sleeve 35 is formed from a material, specifically the above-described synthetic resin, that is lower in hardness than the inner wall of the anchor hole 91 formed in the skeleton 90, the constructor can easily insert the sleeve 35 in the anchor hole 91 to a predetermined depth without strongly striking the taper bolt 31 into the anchor hole 91 with an iron hammer or the like. This improves the workability.

In addition, since, when the sleeve 35 is inserted, the locking ribs 352 apply only a very small load to the inner wall surface of the anchor hole 91, it is prevented that a metal part of the outer peripheral surface bites into the inner wall surface of the anchor hole 91 to cause a crack in the inner wall surface, as in a conventional product. In addition, since a small load is applied to the inner wall surface, it is possible to construct the anchor bolt 12 at a position close to an edge of the skeleton 90, compared to a conventional product.

Third Embodiment

The following describes, with reference to FIG. 13, FIG. 14A, and FIG. 14B, a configuration of an anchor bolt 13 according to a third embodiment of the present disclosure. Here, FIG. 13 is a perspective diagram showing the anchor bolt 13. FIG. 14A is a side diagram of the anchor bolt 13, and FIG. 14B is a partial cross-sectional diagram of the anchor bolt 13. FIG. 14B shows a cross-sectional structure of members other than a bolt 41.

It is noted that in the present embodiment, reference signs assigned to the above-described configurations of the first embodiment are also assigned to such configurations that are common to or cause substantially the same acts as those of the first embodiment, and description thereof is omitted.

As shown in FIG. 13, the anchor bolt 13 includes the bolt 41 (an example of the bolt main body of the present disclosure), the flat washer 24, the sleeve 25 (an example of the tubular member of the present disclosure), the expansively openable ring 26 (an example of the expansively openable member of the present disclosure), and a cone nut 47 (an example of the push-in portion of the present disclosure). The anchor bolt 13 differs from the anchor bolt 11 of the first embodiment in that it includes the bolt 41 and the cone nut 47 instead of the taper bolt 21. Otherwise, the anchor bolt 13 has the same configuration as the anchor bolt 11.

The bolt 41 is what is called a hexagon head bolt, namely, a bolt having a hexagon nut at its head. A male screw is formed on a screw portion 48 of the bolt 41. The bolt 41 is formed from the same material as the above-described taper bolt 21 of the first embodiment.

The cone nut 47 is configured to be screwed on the screw portion 48 of the bolt 41, and is a nut member in which a female screw is formed. The cone nut 47 is formed from the same material as the above-described taper bolt 21 of the first embodiment. The cone nut 47 is screwed on the screw portion 48 of the bolt 41, and expands the expansively openable ring radially outward by being pushed into the inner hole of the expansively openable ring 26. The cone nut 47 is formed in the same shape, namely in an approximately truncated cone shape, as the cone portion 27 of the taper bolt 21 except that the female screw is formed therein. That is, the cone nut 47 is formed in shape widening toward a tip of the anchor bolt 13 such that the outer diameter of a part of an outer peripheral surface 471 of the cone nut 47 having the minimum diameter is smaller than the inner diameter of the expansively openable ring 26, and the outer diameter of a part of the outer peripheral surface 471 having the maximum diameter is larger than the inner diameter of the expansively openable ring 26.

In addition, the cone nut 47 is provided with an annular protruding portion 472 that has the same configuration as the protruding portion 272 of the cone portion 27. For this reason, a step 472A is formed between the outer peripheral surface 471 and the protruding portion 472.

Since the cone nut 47 is to be inserted in the anchor hole 91 during the attachment construction of the anchor bolt 13, the outer diameter of the protruding portion 472 is smaller than the inner diameter of the anchor hole 91. That is, the anchor hole 91 formed in the skeleton 90 has a prescribed size that is larger than the maximum diameter of the cone nut 47 (the outer diameter of the protruding portion 472).

The following describes an attachment structure of the anchor bolt 13 with reference to FIG. 15A to FIG. 15C. Here, FIG. 15A is a diagram showing a state where the sleeve 25 and the cone nut 47 of the anchor bolt 13 are inserted in the anchor hole 91, FIG. 15B is a diagram showing a state where the bolt 41 is screw-fitted into the cone nut 47, and FIG. 15C is a diagram showing a fixed state where the bolt 41 is tightened to the cone nut 47 and the attachment construction is completed. It is noted that the slits 253 are omitted in FIG. 15A to FIG. 15C.

To construct the anchor bolt 13, the constructor inserts the anchor bolt 13 with the bolt 41 and the flat washer 24 attached thereto, into the attachment hole 81 of the structural member 80, and into the anchor hole 91 (see FIG. 15A). At this time, the constructor pushes the sleeve 25 into the anchor hole 91 until the upper end of the sleeve 25 becomes flush with the surface of the skeleton 90 (see FIG. 15B). This allows the locking pieces 252 of the sleeve 25 to be pressed against the inner surface of the anchor hole 91, and the sleeve 25 is fixed in the anchor hole 91.

Subsequently, the constructor tightens the bolt 41 by a predetermined torque by using an electric or air driving impact wrench or the like (see FIG. 15C). This causes the bolt 41 to be screw-fitted into the cone nut 47, and only the cone nut 47 is pulled up. As the cone nut 47 is pulled up, the cone nut 47 is pressed into the inner hole of the expansively openable ring 26. Specifically, the cone nut 47 is pressed into the inner hole of the small diameter tube portion 254. This causes the expansively openable ring 26 to be expanded radially outward by the inclination of the outer peripheral surface 471 of the cone nut 47 (see FIG. 15C). The expanded expansively openable ring 26 bites into the inner wall surface of the anchor hole 91 and is fixed therein. This causes the anchor bolt 13 to be fixed in the anchor hole 91.

With the above-described configuration, the anchor bolt 13 of the present embodiment exhibits the same effect as the anchor bolt 11 of the first embodiment.

Fourth Embodiment

The following describes, with reference to FIG. 16 to FIG. 19, a configuration of an anchor bolt 14 according to a fourth embodiment of the present disclosure. Here, FIG. 16 is a perspective diagram showing the anchor bolt 14. FIG. 17A is a side diagram of the anchor bolt 14, and FIG. 17B is a partial cross-sectional diagram of the anchor bolt 14. FIG. 17B shows a cross-sectional structure of members other than the taper bolt 31. In addition, FIG. 18 and FIG. 19 are diagrams showing a sleeve 45 attached to the anchor bolt 14.

It is noted that in the present embodiment, reference signs assigned to the above-described configurations of the first embodiment are also assigned to such configurations that are common to or cause substantially the same acts as those of the first embodiment, and description thereof is omitted.

As shown in FIG. 16, the anchor bolt 14 includes the taper bolt 31 (an example of the bolt main body of the present disclosure), the nut 22, the flat washer 24, the sleeve 45 (an example of the tubular member of the present disclosure), the expansively openable ring 26 (an example of the expansively openable member of the present disclosure), and the cone portion 27 (an example of the push-in portion of the present disclosure).

As shown in FIG. 17A and FIG. 17B, the taper bolt 31 is a bolt with a male screw formed on its outer peripheral surface, and its tip is integrally formed with the cone portion 27. The male screw is formed from a top toward the tip of the taper bolt 31. A tip side of the taper bolt 31 is inserted in the anchor hole 91 (see FIG. 12A) formed in the skeleton 90. It is noted that since the taper bolt 31 has the same configuration as the one applied to the above-described first embodiment, a detailed description thereof is omitted here.

As shown in FIG. 17A and FIG. 17B, the sleeve 45 is a tubular member formed in an approximately cylindrical shape. The sleeve 45 is attached to the taper bolt 31, and specifically, is attached to the support portion 311 of the taper bolt 31. The sleeve 45 is formed from the same material, namely, a synthetic resin, as the sleeve 25 of the first embodiment. In the present embodiment, the outer diameter of the sleeve 45 is formed to be approximately the same as the inner diameter of the anchor hole 91 of the prescribed size.

As shown in FIG. 18 and FIG. 19, the sleeve 45 includes a first sleeve 45A and a second sleeve 45B. The first sleeve 45A and the second sleeve 45B are assembled to each other to form the sleeve 45 as a tubular member. In the present embodiment, the first sleeve 45A and the second sleeve 45B are formed from different types of synthetic resin, and the first sleeve 45A is formed from a synthetic resin that is softer than that of the second sleeve 45B. Of course, the first sleeve 45A and the second sleeve 45B may be formed from materials that have the same hardness.

The first sleeve 45A includes: a tube main body portion 451 (an example of the tube main body portion of the present disclosure) that is inserted onto the screw portion 28 of the taper bolt 31, and is formed in a cylindrical shape elongated in the axial direction of the screw portion 28; and an engagement portion 452 formed in a semi-cylindrical shape protruding from an end part in an insertion direction (the tip side). The first sleeve 45A is formed to be longer in the axial direction than the second sleeve 45B that is described below. Specifically, the first sleeve 45A is formed to be two times or more of the second sleeve 45B in length in the axial direction. As shown in FIG. 17B, the tube main body portion 451 is inserted onto and attached to the screw portion 28 so as to cover almost the entirety of the screw portion 28.

An end part of the tube main body portion 451 on a side opposite to the insertion direction (a base end side) is integrally formed with a flange 453 that is abutted on the flat washer 24. The outer diameter of the flange 453 is larger than the inner diameter of an inner hole of the flat washer 24.

The engagement portion 452 is configured to be engaged with the second sleeve 45B. As shown in FIG. 19, a projection rib 454 is formed to project continually in the peripheral direction on an inner surface 4521 of the engagement portion 452. That is, the projection rib 454 extends on the inner surface 4521 in the peripheral direction. The projection rib 454 is configured to be engaged with an engagement groove 458 (see FIG. 18) formed in the second sleeve 45B, the engagement groove 458 described below. In the present embodiment, the projection rib 454 is formed in a hook shape so that the projection rib 454 engaged with the engagement groove 458 is hardly disengaged. Specifically, an inclined surface extending from its top to the inner surface 4521 is formed on a tip side of the projection rib 454, and a perpendicular surface extending from the top to the inner surface 4521 is formed on a base end side of the projection rib 454.

The second sleeve 45B includes: a main body portion 455 which is attached to the support portion 311 and in which a slit 456 is formed along a center axis direction of the tubular member; and a small diameter tube portion 457 (an example of the small diameter tube portion of the present disclosure) which projects from an end of the main body portion 455 on the insertion direction side. The slit 456 is formed continually from the main body portion 455 to the small diameter tube portion 457.

The small diameter tube portion 457 corresponds to the small diameter tube portion 254 in each of the above-described embodiments, and is disposed between the inner surface of the expansively openable ring 26 and the outer peripheral surfaces of the taper bolt 31 and the cone portion 27. The small diameter tube portion 457 has the same configuration as the small diameter tube portion 254 of each of the above-described embodiments except that is includes the slit 456, and a detailed description thereof is omitted here.

The slit 456 is configured to be spread so that the second sleeve 45B is expanded when the second sleeve 45B is attached to the support portion 311. In a state where the slit 456 of the second sleeve 45B is spread, the second sleeve 45B can be attached to the support portion 311.

As shown in FIG. 18, an engagement surface 4551 is formed on the outer peripheral surface of the main body portion 455 of the second sleeve 45B, wherein the engagement surface 4551 is brought into surface contact with the inner surface 4521 of the engagement portion 452. The thickness of the engagement surface 4551 is obtained by reducing the thickness of the engagement portion 452 from the outer peripheral surface of the main body portion 455. For this reason, a step 4552 is formed between the engagement surface 4551 and the outer peripheral surface of the main body portion 455.

When the first sleeve 45A and the second sleeve 45B are assembled to each other, in a state where the inner surface 4521 of the engagement portion 452 is abutted on the engagement surface 4551, the outer peripheral surface of the engagement portion 452 becomes flush with the outer peripheral surface of the main body portion 455. In addition, in a state where the first sleeve 45A and the second sleeve 45B are assembled to each other, an end portion 4522 of the engagement portion 452 at an end in the peripheral direction thereof and the step 4552 face each other in the peripheral direction, and come close to or abut on each other. This allows the first sleeve 45A and the second sleeve 45B to be engaged with each other in the peripheral direction. With this configuration, during the construction of the anchor bolt 14, the first sleeve 45A and the second sleeve 45B are integrated with each other such that one of the sleeves does not rotate around the axis relatively with respect to the other.

The engagement groove 458 in which the projection rib 454 can be inserted is formed in the engagement surface 4551 of the tube main body portion 451. The engagement groove 458 is formed continually in the peripheral direction. That is, the engagement groove 458 is formed to extend in the peripheral direction on the engagement surface 4551. When the first sleeve 45A and the second sleeve 45B are assembled to each other, the projection rib 454 is inserted in the engagement groove 458. This allows the first sleeve 45A and the second sleeve 45B to be engaged with each other in the insertion direction. As a result, the first sleeve 45A and the second sleeve 45B are hardly separated from each other during the construction of the anchor bolt 14.

In the sleeve 45 configured as described above, first, the second sleeve 45B is attached to the support portion 311. Subsequently, the first sleeve 45A is inserted onto the screw portion 28, and is pressed toward the second sleeve 45B. At this time, the engagement portion 452 is overlapped on and engaged with the engagement surface 4551. This allows the first sleeve 45A and the second sleeve 45B to be engaged with each other in the peripheral direction. In addition, since the projection rib 454 is engaged with the engagement groove 458, the first sleeve 45A and the second sleeve 45B are engaged with each other in the insertion direction, too.

Although the present embodiment shows as one example a configuration where the projection rib 454 and the engagement groove 458 extend in the peripheral direction, the projection rib 454, for example, may extend in the axial direction. In this case, it is preferable that the engagement groove 458 extends in the axial direction, too, and is located in such a way as to be engaged with the projection rib 454. In this case, at least one projection rib 454 and at least one engagement groove 458 may be provided, and more preferably, a plurality of projection ribs 454 and a plurality of engagement grooves 458 are provided. It is noted that the projection rib 454 and the engagement groove 458 are not necessarily required and may be omitted.

With the anchor bolt 14 of the present embodiment, since the above-described first sleeve 45A is provided therein, in a state where the anchor bolt 14 is attached to the anchor hole 91, not only the outer peripheral surface of the second sleeve 45B, but also the outer peripheral surface of the first sleeve 45A comes in contact with the inner surface of the anchor hole 91. This causes an appropriate contact friction on the anchor bolt 14 in the peripheral direction. It is noted that the method for constructing the anchor bolt 14 by attaching it to the anchor hole 91 is the same as the method for constructing the anchor bolt 12 described in the second embodiment, and thus, for the construction method, please consult the above-provided description of the attachment structure with reference to FIG. 12A to FIG. 12C.

With the above-described configuration, the anchor bolt 14 of the present embodiment exhibits the same effect as the anchor bolts 11, 12, 13 of the first to third embodiments described above.

The embodiments of the present disclosure described above include the following disclosure items (1) to (9).

Present disclosure (1) is an anchor bolt configured to be fixed in an anchor hole formed in a skeleton. The anchor bolt includes: a bolt main body, with a screw thread formed on an outer peripheral surface thereof, including an insertion portion that is inserted in the anchor hole; a tubular member that is attached to the bolt main body and includes a locking portion configured to be, in a state of being disposed in the anchor hole, locked to an inner side surface of the anchor hole; an annular expansively openable member attached to the bolt main body at a position closer to a tip side of the anchor bolt than the tubular member, and divided in a peripheral direction; and a push-in portion configured to expand the expansively openable member radially outward by being pushed into an inner hole of the expansively openable member.

With the above-described configuration, it is possible to minimize noncontact part of the expansively openable member that is not in contact with an inner wall of the anchor hole. As a result, it is possible to enhance the pull-off strength of the anchor bolt.

Present disclosure (2) is the anchor bolt according to the present disclosure (1), wherein a division line in the expansively openable member extends from a first end portion that appears at one side of the expansively openable member to a second end portion that appears at the other side of the expansively openable member, and the first end portion and the second end portion are separated from each other in a peripheral direction of the expansively openable member.

With this configuration, the expansively openable member comes in contact with and bites the inner wall of the anchor hole over its peripheral entire area. As a result, it is possible to significantly enhance the pull-off strength of the anchor bolt.

Present disclosure (3) is the anchor bolt according to the present disclosure (1) or (2), wherein the tubular member includes: a tube main body portion; and a small diameter tube portion which extends from an end of the tube main body portion on the tip side toward the tip side, and is disposed between an inner surface of the expansively openable member and an outer peripheral surface of the push-in portion, wherein an outer diameter of the small diameter tube portion is smaller than an outer diameter of the tube main body portion.

Present disclosure (4) is the anchor bolt according to the present disclosure (3), wherein the expansively openable member is attached to the small diameter tube portion in a state where an inner surface of the expansively openable member is in close contact with an outer peripheral part of the small diameter tube portion.

With this configuration, the expansively openable member is stably supported by the small diameter tube portion.

Present disclosure (5) is the anchor bolt according to the present disclosure (3) or (4), wherein the tubular member includes at least one slit that extends from an end of the small diameter tube portion on the tip side toward the tube main body portion.

This configuration provides flexibility to the small diameter tube portion. As a result, when the push-in portion is pushed and pressed into an inner hole of the small diameter tube portion, the small diameter tube portion is bent radially outward. This prevents damage such as cracking of the small diameter tube portion when the push-in portion is pressed therein.

Present disclosure (6) is the anchor bolt according to the present disclosure (5), wherein the slit extends to near a center of the tube main body portion.

This configuration provides flexibility to the tube main body portion, as well.

Present disclosure (7) is the anchor bolt according to any one of the present disclosures (1) to (6), wherein the expansively openable member is preferably formed from a material that is mainly composed of a metal having ductility.

Present disclosure (8) is the anchor bolt according to any one of the present disclosures (1) to (7), wherein the tubular member is formed from a material that is lower in hardness than the push-in portion and the expansively openable member.

With this configuration, when the push-in portion is pressed in and a strong force is applied radially outward in a state where the small diameter tube portion is disposed between the push-in portion and the expansively openable member, the small diameter tube portion is collapsed and expanded. For this reason, even when there is a gap between the push-in portion and the expansively openable member, the gap is filled with the small diameter tube portion. With this configuration, the push-in portion and the expansively openable member come in close contact with each other with the small diameter tube portion therebetween. In addition, since the small diameter tube portion is formed from a material that is lower in hardness than the expansively openable member, the small diameter tube portion is brought into close contact between the push-in portion and the expansively openable member, and the small diameter tube portion takes a role of a slip-stop. Accordingly, even if a force in the peripheral direction is applied to the push-in portion, the push-in portion does not slide in the peripheral direction with respect to the small diameter tube portion and the expansively openable member. In addition, the expansively openable member does not slide in the peripheral direction with respect to the small diameter tube portion.

Present disclosure (9) is the anchor bolt according to the present disclosure (8), wherein the tubular member is preferably formed from a material that is mainly composed of a synthetic resin.

The invention claimed is:

1. An anchor bolt configured to be fixed in an anchor hole formed in a skeleton, the anchor bolt comprising:

a bolt main body, with a screw thread formed on an outer peripheral surface thereof, including an insertion portion that is inserted in the anchor hole;

a tubular member that is attached to the bolt main body and includes a locking portion configured to be, in a state of being disposed in the anchor hole, locked to an inner side surface of the anchor hole, the tubular member including a smaller diameter tube portion at an end thereof, and including a tube main body portion next to the smaller diameter tube portion;

an annular expansively openable member divided in a peripheral direction, the annular expansively openable member disposed on the smaller diameter tube portion which extends from the tube main body portion; and a push-in portion configured to expand the expansively openable member radially outward by being pushed into an inner hole of the expansively openable member, wherein the small diameter tube portion is disposed between an inner surface of the expansively openable member and an outer peripheral surface of the push-in portion, wherein an outer diameter of the small diameter tube portion is smaller than an outer diameter of the tube main body portion.

2. The anchor bolt according to claim 1, wherein a division line in the expansively openable member extends from a first end portion that appears at one side of the expansively openable member to a second end portion that appears at the other side of the expansively openable member, and the first end portion and the second end portion are separated from each other in a peripheral direction of the expansively openable member.

3. The anchor bolt according to claim 1, wherein the expansively openable member is attached to the small diameter tube portion in a state where an inner surface of the expansively openable member is in close contact with an outer peripheral part of the small diameter tube portion.

4. The anchor bolt according to claim 1, wherein the tubular member includes at least one slit that extends from an end of the small diameter tube portion on the tip side toward the tube main body portion.

5. The anchor bolt according to claim 4, wherein the slit extends to near a center of the tube main body portion.

6. The anchor bolt according to claim 1, wherein the expansively openable member is formed from a material that is mainly composed of a metal having ductility.

7. The anchor bolt according to claim 1, wherein the tubular member is formed from a material that is lower in hardness than the push-in portion and the expansively openable member.

8. The anchor bolt according to claim 7, wherein the tubular member is formed from a material that is mainly composed of a synthetic resin.

* * * * *